(12) United States Patent
Pietarinen et al.

(10) Patent No.: US 12,079,916 B2
(45) Date of Patent: *Sep. 3, 2024

(54) RENDERING OF PERSISTENT PARTICLE TRAILS FOR DYNAMIC DISPLAYS

(71) Applicant: The Boeing Company, Chicago, IL (US)

(72) Inventors: Seppo A. Pietarinen, Helsinki (FI); Brian P. Farm, South Portland, ME (US)

(73) Assignee: The Boeing Company, Arlington, VA (US)

( * ) Notice: Subject to any disclaimer, the term of this patent is extended or adjusted under 35 U.S.C. 154(b) by 210 days.

This patent is subject to a terminal disclaimer.

(21) Appl. No.: 17/726,473

(22) Filed: Apr. 21, 2022

(65) Prior Publication Data

US 2022/0343581 A1 Oct. 27, 2022

Related U.S. Application Data

(60) Provisional application No. 63/180,038, filed on Apr. 26, 2021.

(51) Int. Cl.
*G06T 7/70* (2017.01)
*G06T 1/60* (2006.01)
*G06T 15/00* (2011.01)

(52) U.S. Cl.
CPC .............. *G06T 15/005* (2013.01); *G06T 1/60* (2013.01); *G06T 7/70* (2017.01); *G06T 2200/24* (2013.01)

(58) Field of Classification Search
None
See application file for complete search history.

(56) References Cited

U.S. PATENT DOCUMENTS

| | | | |
|---|---|---|---|
| 7,372,472 B1 * | 5/2008 | Bordeleau | G06T 13/60 345/473 |
| 2002/0085000 A1 * | 7/2002 | Sullivan | G06T 15/405 345/422 |
| 2003/0083854 A1 * | 5/2003 | Cronin | G06T 13/20 703/2 |
| 2015/0039146 A1 * | 2/2015 | Wei | G05B 13/026 700/291 |
| 2018/0166045 A1 * | 6/2018 | Shah | G09G 5/14 |

* cited by examiner

*Primary Examiner* — Saptarshi Mazumder
(74) *Attorney, Agent, or Firm* — Alleman Hall & Tuttle LLP

(57) ABSTRACT

A method including defining, in a buffer, a particle having an initial position in an absolute coordinate system independent of a graphical user interface (GUI) in which the particle is renderable. The method also includes assigning a memory range within the buffer to the particle. The method also includes generating, in the memory range, an updated position in the absolute coordinate system for the particle. The method also includes determining, in the memory range and from a combination of the initial position and the updated position, vertices for the particle. The method also includes creating, from vertices, a particle trail for the particle in the absolute coordinate system. The method also includes storing the particle trail in the memory range within the buffer.

20 Claims, 13 Drawing Sheets

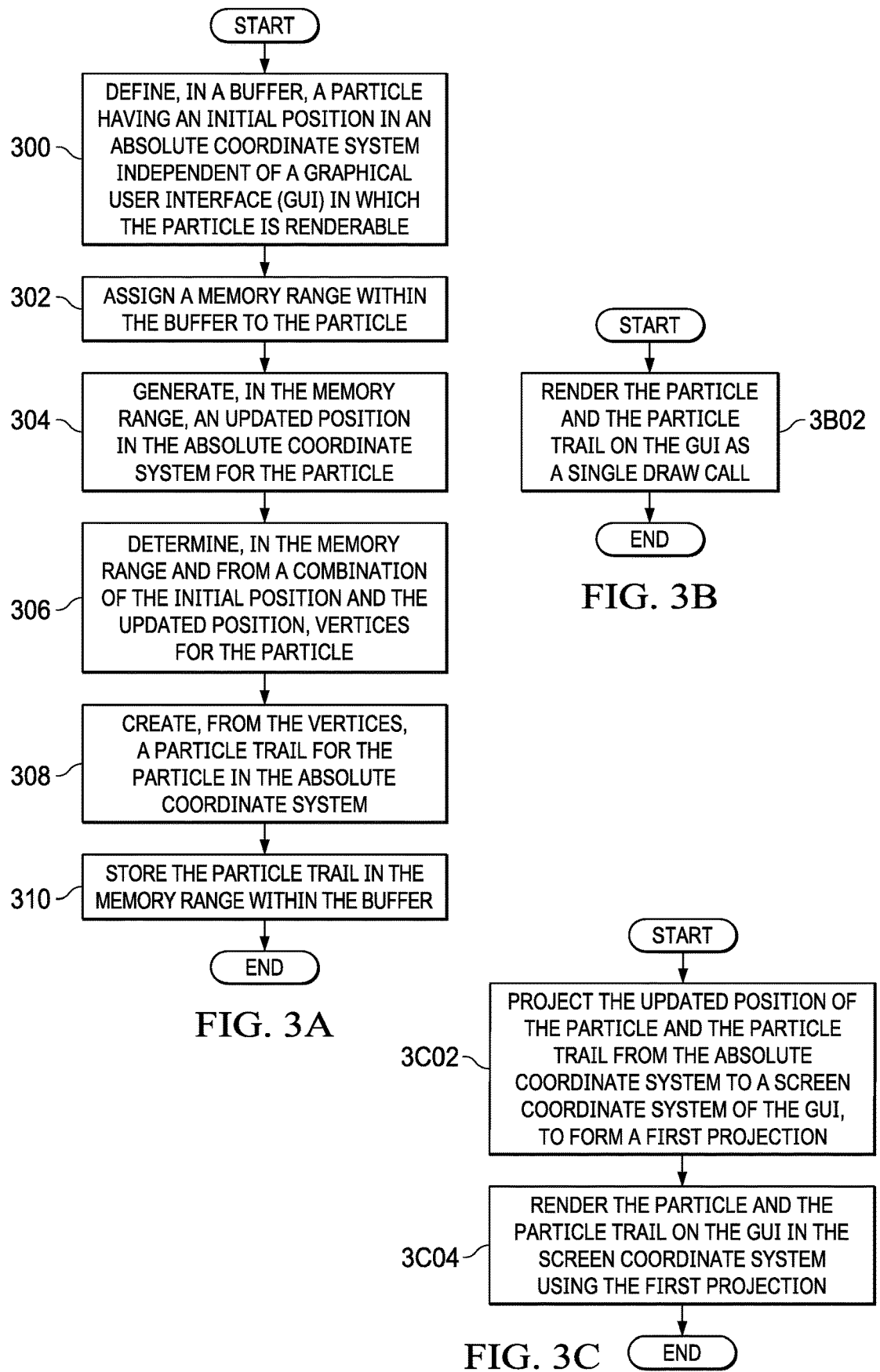

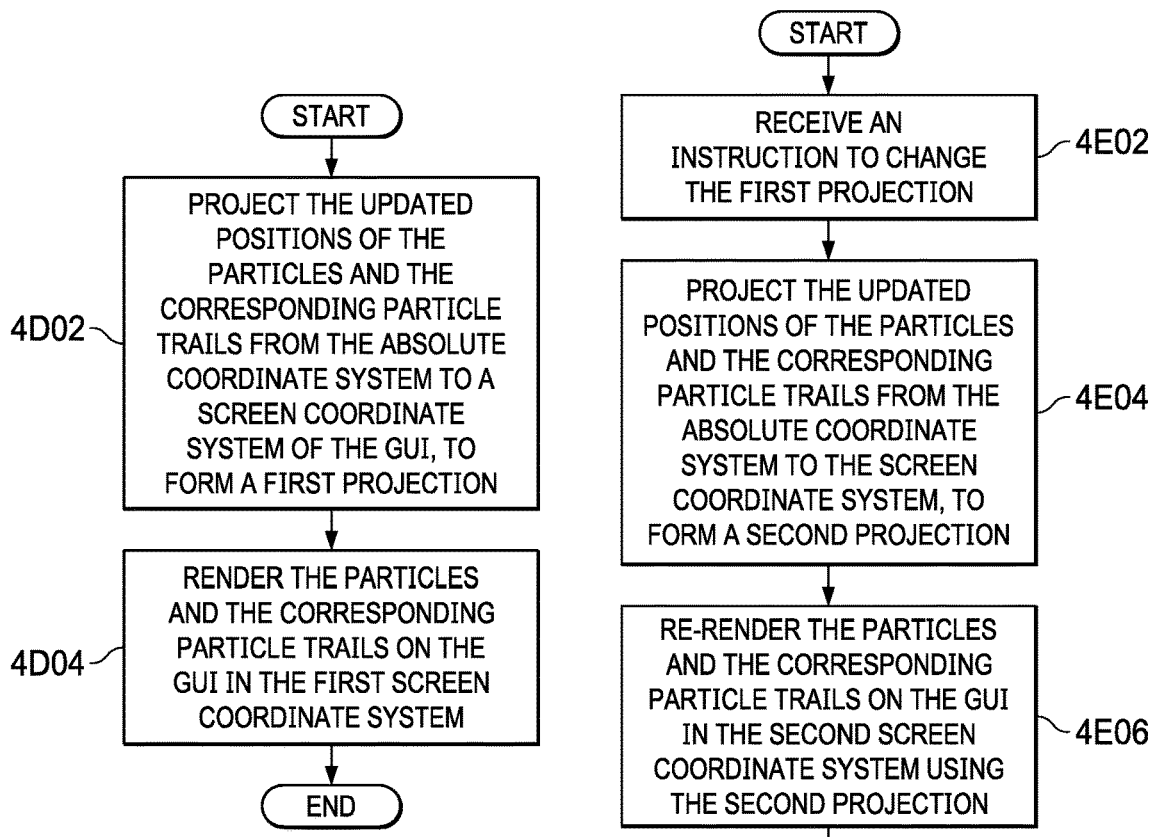
FIG. 4D
FIG. 4E
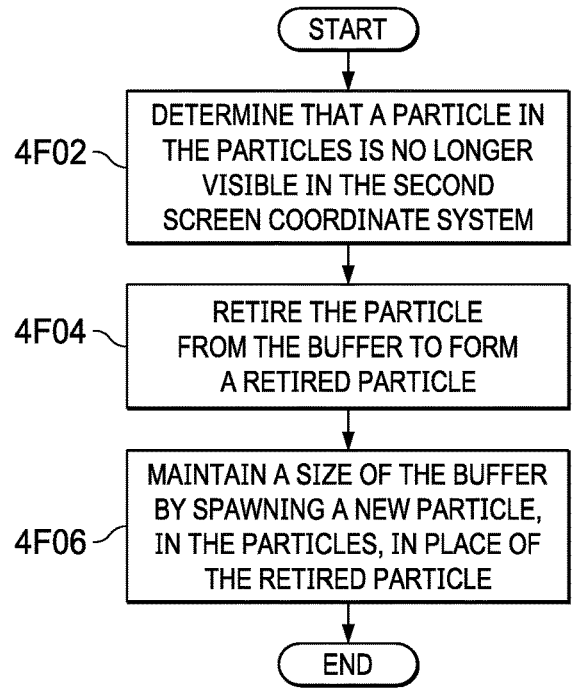
FIG. 4F

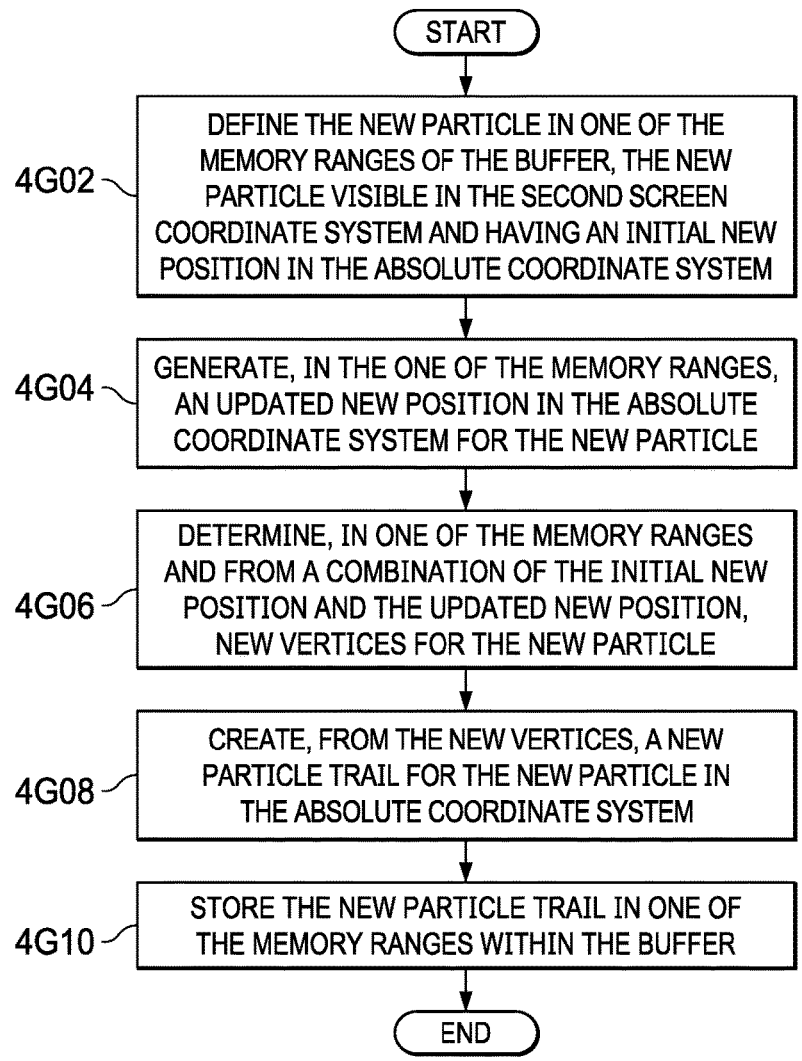
FIG. 4G
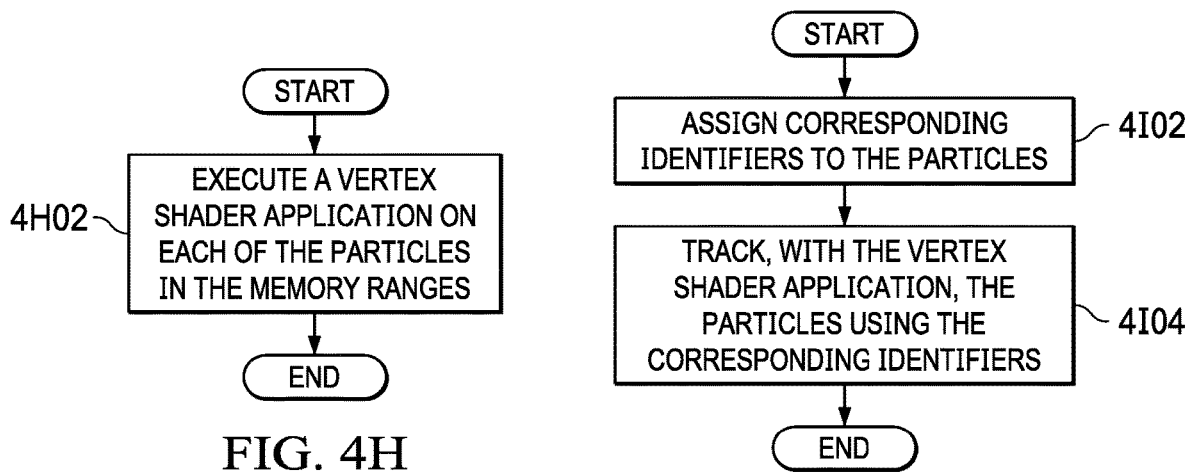
FIG. 4H
FIG. 4I

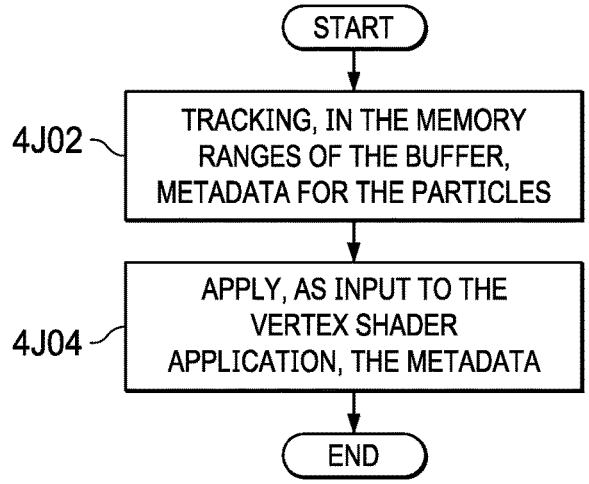
FIG. 4J
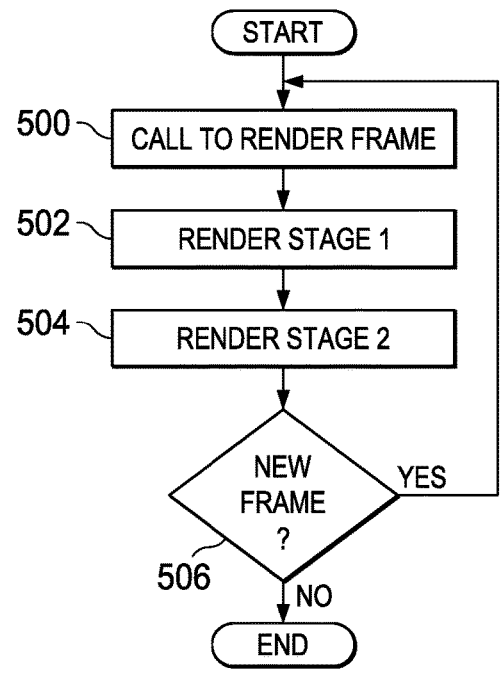
FIG. 5
TABLE 1: PARTICLE BUFFER AT FRAME 1 BEFORE FIRST STAGE RENDERING
| | POSITION | POSITION | POSITION | POSITION | POSITION | AGE | MAXIMUM AGE |
|---|---|---|---|---|---|---|---|
| PARTICLE 1 | (1,0) | NIL | NIL | NIL | NIL | 0 | 10 |
| PARTICLE 2 | (6,0) | NIL | NIL | NIL | NIL | 0 | 10 |
FIG. 6
TABLE 2: PARTICLE BUFFER AT FRAME 1 AFTER FIRST STAGE RENDERING
| | POSITION | POSITION | POSITION | POSITION | POSITION | AGE | MAXIMUM AGE |
|---|---|---|---|---|---|---|---|
| PARTICLE 1 | (1,0) | (2,0) | NIL | NIL | NIL | 1 | 10 |
| PARTICLE 2 | (6,0) | (7,0) | NIL | NIL | NIL | 1 | 10 |
FIG. 7

TABLE 3: CALCULATED VERTEX POSITIONS FOR ON SCREEN RENDERING AFTER ONE FRAME

| PARTICLE 1 POSITIONS | | | | | PARTICLE 2 POSITIONS | | | | |
|---|---|---|---|---|---|---|---|---|---|
| VERTEX PAIR 1 | VERTEX PAIR 2 | VERTEX PAIR 3 | VERTEX PAIR 4 | VERTEX PAIR 5 | VERTEX PAIR 6 | VERTEX PAIR 7 | VERTEX PAIR 8 | VERTEX PAIR 9 | VERTEX PAIR 10 |
| (1,0) | (2,0) | (2,0) | (2,0) | (2,0) | (6,0) | (7,0) | (7,0) | (7,0) | (7,0) |
| (1,0) | (2,0) | (2,0) | (2,0) | (2,0) | (6,0) | (7,0) | (7,0) | (7,0) | (7,0) |

TABLE 4: PARTICLE POSITION BUFFER AFTER FIVE FRAMES

|   | POSITION | POSITION | POSITION | POSITION | POSITION | AGE | MAXIMUM AGE |
|---|---|---|---|---|---|---|---|
| PARTICLE 1 | (1,0) | (2,0) | (3,0) | (4,0) | (5,0) | 6 | 10 |
| PARTICLE 2 | (6,0) | (7,0) | (8,0) | (9,0) | (10,0) | 6 | 10 |

FIG. 10

TABLE 5: CALCULATED VERTEX POSITIONS FOR ON SCREEN RENDERING AFTER FIVE FRAMES (TRIANGLE STRIP EXAMPLE)

| VERTEX PAIR 1 | VERTEX PAIR 2 | VERTEX PAIR 3 | VERTEX PAIR 4 | VERTEX PAIR 5 | VERTEX PAIR 6 | VERTEX PAIR 7 | VERTEX PAIR 8 | VERTEX PAIR 9 | VERTEX PAIR 10 |
|---|---|---|---|---|---|---|---|---|---|
| (1,0,0) | (2,-0.5) | (3,-0.5) | (4,-0.5) | (5,0,0) | (6,0,0) | (7,-0.5) | (8,-0.5) | (9,-0.5) | (10,0,0) |
| (1,0,0) | (2,0.5) | (3,0.5) | (4,0.5) | (5,0,0) | (6,0,0) | (7,0.5) | (8,0.5) | (9,0.5) | (10,0,0) |

FIG. 11

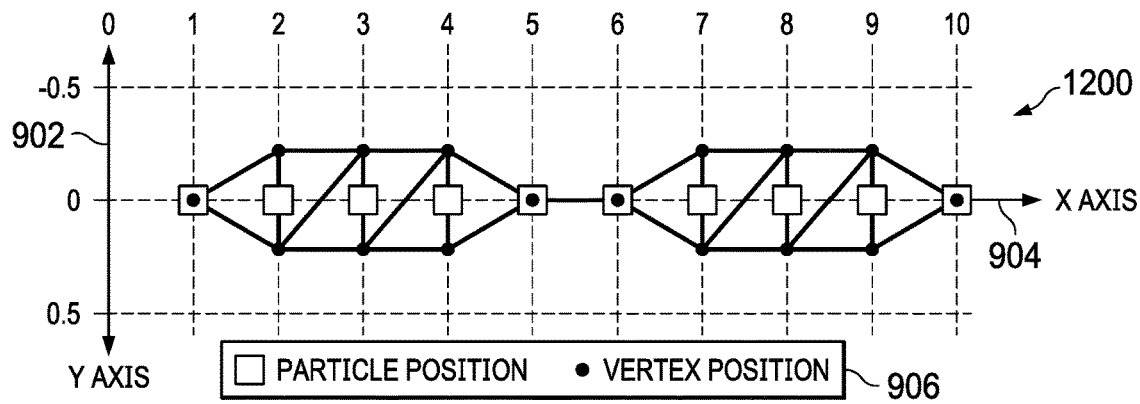

FIG. 12

1300 TABLE 6: PARTICLE BUFFER AT FRAME 1 BEFORE FIRST STAGE RENDERING

|  | POSITION | AGE | MAXIMUM AGE |
|---|---|---|---|
| PARTICLE 1 | (1,0) | 0 | 10 |
| PARTICLE 2 | (6,0) | 0 | 10 |

FIG. 13

TABLE 7: PARTICLE BUFFER AT FRAME 1 AFTER FIRST STAGE RENDERING 1400

|  | POSITION | AGE | MAXIMUM AGE |
|---|---|---|---|
| PARTICLE 1 | (2,0) | 1 | 10 |
| PARTICLE 2 | (7,0) | 1 | 10 |

FIG. 14

1500 TABLE 8: CALCULATED VERTEX POSITIONS FOR ON SCREEN RENDERING AFTER ONE FRAME

|  | PARTICLE 1 VERTEX POSITIONS | | | |
|---|---|---|---|---|
|  | VERTEX 1 | VERTEX 2 | VERTEX 3 | VERTEX 4 |
| PARTICLE 1 | (0.5,-0.5) | (1.5,-0.5) | (1.5,0.5) | (0.5,0.5) |
| PARTICLE 2 | (6.5,-0.5) | (7.5,-0.5) | (7.5,0.5) | (6.5,0.5) |

FIG. 15

RENDERING OF PERSISTENT PARTICLE TRAILS FOR DYNAMIC DISPLAYS

RELATED APPLICATIONS

This application claims priority to U.S. Provisional Patent Application No. 63/180,038, filed Apr. 26, 2021, the contents of which are hereby incorporated by reference in their entirety.

BACKGROUND

Rendering of particles with particle trails on a graphical user interface (GUI) is computationally expensive. While a screen space buffer can be used to store positions of particles along with their trails, the stored positions and trails are only valid for a particular viewpoint. When the user shifts the viewpoint or shifts a zoom level, the screen space buffer is cleared, and the particles and their trails are re-calculated for the new viewpoint or zoom level. The result is that the user will perceive the clearing of the display on the GUI, and then a noticeable pause where nothing is displayed, before the particles and the particle trails are rendered from the new viewpoint or zoom level.

SUMMARY

The one or more embodiments provide for a method. The method includes defining, in a buffer, a particle having an initial position in an absolute coordinate system independent of a graphical user interface (GUI) in which the particle is renderable. The method also includes assigning a memory range within the buffer to the particle. The method also includes generating, in the memory range, an updated position in the absolute coordinate system for the particle. The method also includes determining, in the memory range and from a combination of the initial position and the updated position, vertices for the particle. The method also includes creating, from vertices, a particle trail for the particle in the absolute coordinate system. The method also includes storing the particle trail in the memory range within the buffer.

The one or more embodiments also provide for a system. The system includes a processor and a display device, in communication with the processor, configured to display a graphical user interface (GUI). The system also includes a memory, in communication with the processor, having a buffer having a first memory range and a second memory range. The system also includes a non-transitory computer readable storage medium in communication with the processor and storing computer readable program code which, when executed by the processor, performs a computer-implemented method. The computer-implemented method includes defining, in the buffer, a particle having an initial position in an absolute coordinate system independent of the GUI. The computer-implemented method also includes assigning the first memory range to the particle. The computer-implemented method also includes generating, in the first memory range, an updated position in the absolute coordinate system for the particle. The computer-implemented method also includes determining, in the first memory range and from a combination of the initial position and the updated position, vertices for the particle. The computer-implemented method also includes creating, from the vertices, a particle trail for the particle in the absolute coordinate system. The computer-implemented method also includes storing the particle trail in the first memory range within the buffer.

The one or more embodiments also provide for a non-transitory computer readable storage medium storing computer readable program code which, when executed by a processor, performs a computer-implemented method. The computer-implemented method includes defining, in a buffer, a particle having an initial position in an absolute coordinate system independent of a graphical user interface (GUI) in which the particle is renderable. The computer-implemented method also includes assigning a memory range within the buffer to the particle. The computer-implemented method also includes generating, in the memory range, an updated position in the absolute coordinate system for the particle. The computer-implemented method also includes determining, in the memory range and from a combination of the initial position and the updated position, vertices for the particle. The computer-implemented method also includes creating, from the vertices, a particle trail for the particle in the absolute coordinate system. The computer-implemented method also includes storing the particle trail in the memory range within the buffer.

Other aspects of the one or more embodiments will be apparent from the following description and the appended claims.

BRIEF DESCRIPTION OF DRAWINGS

FIG. 3A, FIG. 3B, FIG. 3C, FIG. 3D, FIG. 3E, FIG. 3F, FIG. 3G, FIG. 3H, FIG. 3I, FIG. 3J, FIG. 3K show flowcharts of algorithms to execute the one or more embodiments, in accordance with one or more embodiments.

FIG. 4A, FIG. 4B, FIG. 4C, FIG. 4D, FIG. 4E, FIG. 4F, FIG. 4G, FIG. 4H, FIG. 4I, and FIG. 4J show additional flowcharts of algorithms to execute the one or more embodiments, in accordance with one or more embodiments.

FIG. 5 shows a flowchart of a method for rendering particles and particle trails, in accordance with one or more embodiments.

FIG. 6, FIG. 7, and FIG. 8 show tables associated with rendering particles and particle trails, in accordance with one or more embodiments.

FIG. 9 shows vertices in relation to particle positions after a position update, in accordance with one or more embodiments.

FIG. 10 and FIG. 11 show additional tables associated with rendering particles and particle trails, in accordance with one or more embodiments.

FIG. 12 shows renderable vertices in relation to particle positions after additional updates, in accordance with one or more embodiments.

FIG. 13, FIG. 14, and FIG. 15 show additional tables associated with rendering particles and particle trails, in accordance with one or more embodiments.

DETAILED DESCRIPTION

Figure 1:
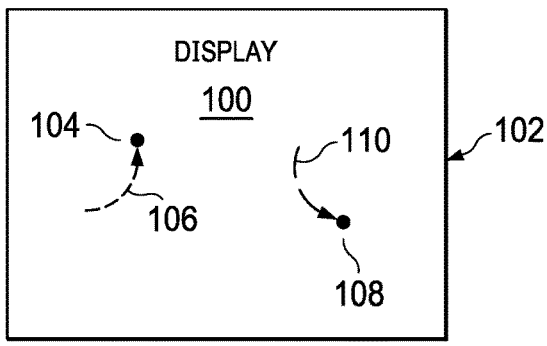
FIG. 1 shows a display device displaying particles moving about the display and also showing particle trails for the particles, in accordance with one or more embodiments.

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

In general, the one or more embodiments relate to improving the speed of rendering, on a display device, particles with associated particle trails. The particles are small rendered objects and the particle trails represent recent previous locations of the particles. In other words, the particle trails represent a brief history of each object's location, in order to provide visualization of dynamic fields. An example of such an application would be to render a display of winds on a map.

Rendering of particle systems involving particle trails is difficult in a dynamic visual display. Where the display represents moving particles in a source space (i.e., a real world set of positions of particles), the particles trails remain in their correct source space locations even as the display viewpoint camera moves, thereby changing the display's screen-space location for the particle trails.

Information about the particle trails that are rendered on the display screen is stored in a memory buffer that represents a fixed viewpoint. Thus, there is a direct mapping of values in the buffer to the rendering on the screen. The buffer contains particle position histories as projected to the display screen, but is valid for the current viewing position only.

Any change in the viewpoint (e.g., zooming or panning the display) causes the stored particle position history to become obsolete. When the position history becomes obsolete, the particles and the particle trails are cleared from the screen. Clearing the display screen is performed each time the user pans or zooms the display. The rendering application then generates a new set of particles based on the source data, and renders the new particles on the display screen. The clearing obsolete particles and rendering of new particles leads to an interruption of the particle display each time the viewpoint is zoomed or panned.

The one or more embodiments address these and other technical issues by providing a technique for generating and rendering the particles and the particle trails. The one or more embodiments do not use a screen space buffer to store projected particle position histories. Instead, the one or more embodiments use a small buffer for each rendered particle to store the most recent positions in source coordinates (e.g., real world coordinates of real particles) instead of screen space coordinates. The source data coordinates are then projected into screen space and rendered as particle trails using a processor (such as a graphics processing unit (GPU)), using a projection that changes as desired when the selected viewpoint changes. The stored particle positions are thus not invalidated when the user zooms or pans the image with the particles and particle trails.

In other words, the one or more embodiments allow the same particles and their histories to be rendered continuously as the display changes (i.e., as the user pans or zooms the display.) If panning or zooming causes an individual particle to no longer be visible within the visible screen space, that particle is retired and the memory for the position and history of the retired particle is then reused for a new particle generated within the currently visible area. The procedure of the one or more embodiments allows for a smoother transition and continuous rendering of existing visible particles while zooming and panning, while simultaneously generating new particles for any newly-visible areas.

Thus, the procedures of the one or more embodiments present a continuous, dynamic representation of particles and the particle trails on the display screen while avoiding interruption of the images on the display screen. Accordingly, the user experience is improved.

Attention is now turned to the figures. FIG. 1 shows a display device displaying particles moving about the display and also showing particle trails for the particles, in accordance with one or more embodiments. FIG. 1 illustrates one example of the nature of the particles and the particle trails rendered according to the principles and techniques described with respect to FIG. 2 through FIG. 16.

FIG. 1 shows a display (100) generated on a display device (102). The display (100) generated on the display device (102) shows two particles with their associated particle trails. In particular, particle (104) is displayed along with associated particle trail (106). Likewise, particle (108) is displayed along with associated particle trail (110).

Each particle, such as the particle (104) and the particle (108), represents an object. The term "object" is defined as something that is being tracked over time. For example, the "object" may be a physical object, such as but not limited to a particle of dust, a section of air within a volume of atmosphere on planet Earth (i.e., an airmass), a molecule, an atom, a sub-atomic particle, etc. In another example, the "object" may be some property that is being tracked, such as but not limited to the current value of a multivariate state of a property being tracked. The one or more embodiments contemplate many different types of objects. Therefore, the term "particle" is read more broadly than a grain of dust or other small physical object commonly associated with the term "particle."

As indicated above, a particle may represent a current value of a multivariate state of some property being tracked. In a more specific example, consider a numeric solution algorithm that finds the best values for some selected set of "N" variables representing a model. The one or more embodiments could be used to graphically depict the behavior of such a numerical solution algorithm over a range of potential starting values. In this specific example, each rendered particle's location represents (at first) the initial starting values of the variables. The changes in those values over time represent the solution algorithm adjusting variable values while attempting to find a solution, such as a mathematical optimization of the variables with respect to a set of conditions. The animated graphical display, in this case, would appear as a set of randomly spaced particles that move around the display. The particles would tend to converge on one or more points in the solution space. Thus, in this case, the display will show one or more two-dimensional or three-dimensional graphs of the variables representing the state.

Each particle trail represents a defined recent history (i. e., with a predetermined time period) of the positions of the particle. Thus, the particle trail (106) shows a history of recent positions of the particle (104). Likewise, the particle trail (110) shows a history of recent positions of the particle (108).

Metadata may also be associated with or identified with a particle. For example, metadata may represent the intensity or rate of particle movement, or other information. Metadata may be rendered for display by varying the size, shape, color, or hashing of the particle trails. In a specific example, wind speed and direction (i. e., velocity) of an airmass (i. e., the "particle" in this example) may be represented as metadata for the particle. The wind velocity may be rendered in the display along with the particle and the particle trail.

One or more highlighting schemes could be used for the particle trails, or for the particles, or a combination thereof For example, particle trails could be made to be animated, or could be in different shades to represent metadata, etc. The particles could also be represented by one or more pre-determined shapes, which could be considered highlighting in this example. Thus, as shown in FIG. 1, the particle trail (106) has a different hash pattern than the particle trail (110). The differing hash patterns represent different highlighting types, though, as indicated above, many different highlighting patterns and types are contemplated.

In a realistic example, the display (100) may show thousands or tens of thousands of particles and their particle trails. Thus, for example, it is possible to show wind velocities, and the recent histories of the wind velocities, for many airmasses over a large region, such as globally over the entire Earth. However, the one or more embodiments have many other applications and are not necessarily limited to showing airmasses (as particles) and the historical positions of the airmasses (as particle trails).

As described above, the one or more embodiments provide for a technique for improving the rendering of the particles and particle trails. Thus, even in a realistic example such as that given above, the one or more embodiments can cause the display device to display a smooth transition of particles and particle trails from one viewpoint or zoom level to another.

Figure 2:
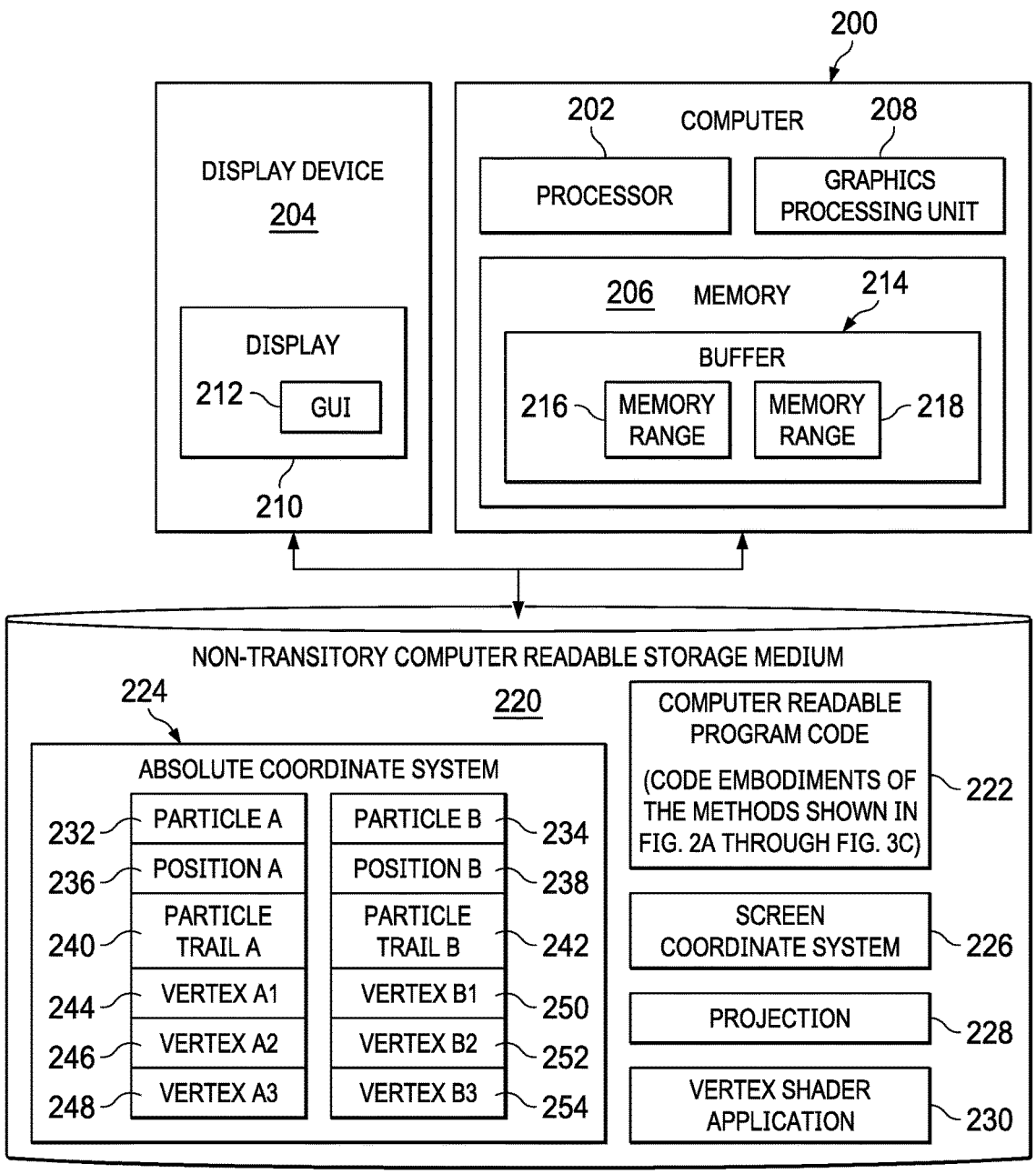
FIG. 2 shows a computing system, in accordance with one or more embodiments.

FIG. 2 shows a computing system, in accordance with one or more embodiments. The computing system of FIG. 2 may be implemented using one or more components of the computing system and network environment shown with respect to FIG. 17A and FIG. 17B.

The system shown in FIG. 2 includes a computer (200). The computer (200) has a processor (202). The processor (202) is a hardware processing unit or a logical processing unit supported by a separate, perhaps remote hardware processing unit.

The processor (202) is in communication with a display device (204). The display device (204) may be part of the computer (200), but could be a remote display device which receives images or videos from the computer (200). The processor (202) is also in communication with a memory (206), described below.

The display device (204) is configured to generate a display (210). The display (210) is an image or a video that is generated by or projected onto the display device (204). The display (210) also is configured to display a graphical user interface (GUI (212)). The GUI (212) may, in some cases, constitute the display (210). The GUI (212) may include one or more widgets. A widget is a button, slide bar, drop-down menu, etc. that a user can manipulate using a user input device in order to interact with an application being executed by the computer (200).

The memory (206) is a transitory (e.g. random access memory) or non-transitory (e.g. a permanent storage medium) that the computer (200) uses as part of executing instructions by the processor (202). The memory (206) includes, in the one or more embodiments, a buffer (214) having at least one memory range, such as but not limited to memory range (216) and memory range (218).

The buffer (214) is a region of a physical memory (in this case, memory (206), but possibly also in graphics processing unit (208) described further below) used to temporarily store data while the data is being moved from one place to another in the computer (200). The buffer (214) may be sub-divided into memory ranges. A memory range is a pre-defined portion of the buffer (214). For example, if the memory is expressed in terms of a number of bits, then a memory range may be a pre-determined number of bits. In the one or more embodiments, the memory range (216) and the memory range (218) are memory ranges in the buffer (214).

The buffer (214) may be of a variety of different types. For example, the buffer (214) may be a ring buffer. A ring buffer is a data structure that is treated as circular, although the implementation of the ring buffer may be linear. When new data is introduced into the ring buffer, data is overwritten at the head of the buffer. Other types of buffers include linear buffers, frame buffers, variable length buffers, etc.

The graphics processing unit (208) is a type of processor. However, many computers have more than one processor, such as a central processing unit ("CPU") (in this example processor (202)) and the graphics processing unit (208). The graphics processing unit (208) is hardware that is designed and dedicated to the processing and rendering of graphics on the display device (204), including the display (210) and the GUI (212).

The graphics processing unit (208) and the processor (202) work together in many applications. Thus, the one or more embodiments may be performed on the processor (202), the graphics processing unit (208), or a combination thereof.

The system shown in FIG. 1 also includes a non-transitory computer readable storage medium (220) in communication with the processor (202). The non-transitory computer readable storage medium (220) is a persistent or non-transitory memory, such as a hard drive, flash drive, etc. The non-transitory computer readable storage medium (220) stores a variety of data.

For example, the non-transitory computer readable storage medium (220) stores computer readable program code (222). The computer readable program code (222), when executed by the processor, performs a computer-implemented, such as the methods described with respect to FIG. 3A through FIG. 5.

The non-transitory computer readable storage medium (220) also stores additional information. For example, the non-transitory computer readable storage medium (220) stores an absolute coordinate system (224). The absolute coordinate system (224) is a coordinate system to which the positions of particles can be referenced independently of how the particles are shown on the display (210) or the GUI (212). An example of the absolute coordinate system (224) may be a real-world coordinate system, such as when a section of air is referenced to a location on planet Earth using latitude and longitude, or a pre-defined coordinate system of a manufacturing floor. Many different examples of the absolute coordinate system (224) are possible.

The non-transitory computer readable storage medium (220) also stores, in contrast, a screen coordinate system (226). The screen coordinate system (226) is a coordinate system that is specific to the display (210) and/or the GUI (212) being displayed on the display device (204). Thus, for example, the screen coordinate system (226) references the position of a particle on the screen. When the user changes the zoom level of the display device (204) or pans the display (210) or GUI (212), then the screen coordinates of each particle changes. Thus, while the screen coordinate system (226) itself does not necessarily change, the position of a given particle within the screen coordinate system (226) will change when the user zooms or pans the display (210) or GUI (212).

The one or more embodiments, as described with respect to FIG. 3A through FIG. 5, provide for a technique in which a projection (228) is generated. The projection (228) is a mathematical transformation that transforms the absolute coordinate system (224) to the screen coordinate system (226). The computer (200) tracks the positions of particles in the absolute coordinate system (224), but when the user zooms or pans the display (210) or the GUI (212), then the computer (200) changes the projection (228) so that the relative positions of the particles in the screen coordinate system (226) are properly displayed. Again, the details of the procedures for generating the projection (228) are described with respect to FIG. 3A through FIG. 5.

The non-transitory computer readable storage medium (220) also stores a vertex shader application (230). The vertex shader application (230) is a programmable function in the graphics processing unit (208) or a standalone application that is used to transform the attributes of vertices (e.g. the points of a triangle or other polygon) such as color, texture, position, and direction from an original space to the display space on the display device (204). Vertices are described further below, with respect to the particles in the absolute coordinate system (224).

The vertex shader application (230) allows the original objects to be moved, distorted, or reshaped as desired. Stated differently, the vertex shader application (230) can process vertices and determine what the coordinates of the vertices are in a "clip-space" (also known as a "view frustum"), which is a space that makes it easy for the computer (200) to understand which vertices are visible to the camera (the user's point of view) and which are not. Vertices that are not visible to the camera (or the view frustum) are cut or "clipped" out. In this manner, the graphics processing unit (208) can perform faster during later rendering stages, since the graphics processing unit (208) has less data to work with. The vertex shader application (230) operates by receiving a vertex from the list of vertices as input, and returns a result that determines where the vertex should be present within clip-space.

The vertex shader application (230) may be individually executable on ones of the memory ranges in the buffer (214) (i.e., the memory range (216) and the memory range (218)). Thus, by assigning one particle and particle trail to each memory range, as explained further below with respect to FIG. 3A through FIG. 4J, the vertex shader application (230) can be used to individually treat each individual particle (i.e., the vertices associated with each individual particle).

The non-transitory computer readable storage medium (220) also stores information about the particles. However, the information of the particles may be loaded into the memory (206) during processing for display on the display device (204). Thus, any reference to data about particles or particle trails as being stored in the non-transitory computer readable storage medium (220) may also refer to data about particles or particle trails that are stored in the memory (206) and/or a dedicated memory in the graphics processing unit (208).

As indicated above, the particles and the particle trails are stored with respect to the absolute coordinate system (224), and thus are shown as being inside the absolute coordinate system (224) in FIG. 2. However, it is expected that the data structure that holds the data that defines the particles is in the form of a relational database, a tree database, a graph database, or some other database. Within the data structure, a particle is specified by an identifier associated with information about the particle, such as particle position and possibly other particle characteristics such as, but not limited to, particle velocity, particle type, etc.

Thus, as shown in FIG. 2, the particles may include particle A (232) and particle B (234). More or fewer particles may be present. The particle A (232) and the particle B (234) are both "particles," as defined above with respect to FIG. 1. As mentioned above, a "particle" could be a section of air within a volume of atmosphere on planet Earth (i.e., an airmass), useable to track the motion of the air (i.e., the wind). However, as indicated above, a "particle" could be a person, an animal, or an object moving in the physical world, a computer generated object within a virtual space, a multivariate state, or represent any other thing that is to be tracked in the absolute coordinate system (224) and ultimately to be projected onto the screen coordinate system (226).

A particle is identified by an identifier. In the example of FIG. 2, the identifiers are the labels "A" (for particle A (232)) and "B" (for particle B (234)). Other identifiers could be used.

A particle is associated with a position in the absolute coordinate system (224). Thus, for example, at a given time "T", the particle A (232) is located at position A (236) in the absolute coordinate system (224). Similarly, at a given time "T", the particle B (234) is located at position B (238) in the absolute coordinate system (224).

A particle is associated with a particle trail, in most cases. As mentioned above, a particle trail is defined as a history of locations of the corresponding particle. However, a particle trail may also include other information, such as particle velocity, particle properties, etc.

Thus, for example, particle A (232) has a corresponding particle trail A (240). The particle trail A (240) is a history of past positions of the particle A (232) at various times. Likewise, the particle B (234) has a corresponding particle trail B (242). The particle trail B (242) is a history of past potions of the particle B (234) at various times.

Each particle is associated with a corresponding vertex or a set of vertices. As used herein, a vertex is defined as a start point or an end point, in the absolute coordinate system (224) or the screen coordinate system (226), of one or more lines that form part of a definition of a particle to be rendered (e.g., the particle A (232) or the particle B (234)). A set of vertices associated with a particle can define a shape for the particle and/or the particle trail. In an example, a video game may render a scene using many geometrical shapes defined by many vertices and lines between the vertices that represent the geometrical shapes. (Textures can be used to fill in details between the lines, though textures are not described here.)

In the one or more embodiments, various shapes and other information about the particles and the particle trails can be defined using a variety of vertices. Vertices can be grouped to define polygons of various shapes, such as but not limited to triangles, rectangular objects, and higher order polygons (pentagons, hexagons, octagons, etc.). An example of using multiple vertices that form triangles is shown in FIG. 5 through FIG. 12, and another example of using multiple vertices that form rectangular objects is shown in FIG. 13 through FIG. 16.

The vertex shader application (230) can be used to render a set of vertices into a shape that is displayed on the display device (204). Thus, the vertex shader application (230) can use vertex A1 (244), vertex A2 (246), and vertex A3 (248) to render the particle A (232), or perhaps to render a past version of the particle A (232) any of the historical positions of the particle A (232) (i.e. the particle trail A (240)). Similarly, the vertex shader application (230) can use vertex B1 (250), vertex B2 (252), and vertex B3 (254) to render the particle B (234), or perhaps to render any of the historical positions of the particle B (234) (i.e. the particle trail B (242)).

While FIG. 2 shows a configuration of components, other configurations may be used without departing from the scope of the one or more embodiments. For example, various components may be combined to create a single component. As another example, the functionality performed by a single component may be performed by two or more components.

FIG. 3A through FIG. 5 are flowcharts, in accordance with one or more embodiments. The methods of FIG. 3A through FIG. 5 may be performed by the system of FIG. 2 and/or supported by the components shown in the computing system of FIG. 17A and FIG. 17B. As used with respect to FIG. 3A through FIG. 4J, the term "GUI" contemplates both the display (210) and the GUI (212) in FIG. 2.

Attention is first turned to FIG. 3A. The method of FIG. 3A may be characterized as a method of creating a particle trail for a particle.

Step 300 includes defining, in a buffer, a particle having an initial position in an absolute coordinate system independent of a graphical user interface (GUI) in which the particle is renderable. A particle is defined by defining characteristics of the particle. The characteristics of a particle are defined at least by the initial position of the particle in the absolute coordinate system. Other characteristics could include, where appropriate, dimensions of a particle, a mass of a particle, particle properties, etc. The particle is defined in the buffer by loading the particle characteristics into a memory range in the buffer.

As indicated above in FIG. 2, the absolute coordinate system is independent of the screen coordinate system. While the two coordinate systems could be the same in some instances, in many cases the two coordinate systems will differ because the user will pan, zoom, or otherwise change a view of the GUI during use of the display device.

Step 302 includes assigning a memory range within the buffer to the particle. The memory range is assigned by loading at least some characteristics of the particle, including at least the initial position of the particle, into a designated memory range within the buffer. In an embodiment, the particle is constrained to the memory range, unless later processing demands require the particle to be moved and then tracked in a new memory range. Generally speaking, a one to one correspondence exists between particles and memory ranges within the buffer.

Step 304 includes generating, in the memory range, an updated position in the absolute coordinate system for the particle. As indicated above, changing positions of the particle in the absolute coordinate system are tracked within the memory range. Examples of tracking particle positions in a memory buffer are shown in FIG. 6 through FIG. 16 with respect to rendering particles. In general, however, an updated position is generated by adding a new coordinate of a new location of the particle within the memory range of the buffer.

Step 306 includes determining, in the memory range and from a combination of the initial position and the updated position, vertices for the particle. The generation of vertices for a particle is described by way of example in FIG. 6 through FIG. 16. Briefly, the vertices are generated from the current and historical positions of the particle (i.e., part of what will become the particle trail). Each position, up to a pre-determined number of positions in the history of positions, represents one vertex.

Step 308 includes creating, from the vertices, a particle trail for the particle in the absolute coordinate system. A set of vertices (i.e. the pre-determined number of vertices from step 306) forms the particle trail. Again, the particle trail is formed from historical positions of the particle over time. The vertices in the particle trail can then be arranged in polygons for later rendering by a vertex shader.

Step 310 includes storing the particle trail in the memory range within the buffer. Because the particle trail is a historical record of past positions of the particle, storing the particle trail is accomplished by storing the updated position determined at step 304 (and/or possibly any other past positions of the particle) within the memory range within the buffer.

The particle trail is stored for later use. One use of the particle trail is to render the particle trail by rendering the polygons defined by the vertices, as shown in FIG. 3B. Another use for the particle trail is to provide the particle trail to another application that takes, as input, the historical positions of the particle as input.

Attention is now turned to FIG. 3B. The method of FIG. 3B may be performed after the method of FIG. 3A.

Step 3B02 includes rendering the particle and the particle trail on the GUI as a single draw call. As indicated above, a vertex shader can be used to render the polygon that is formed by the vertices defined in the particle trail. In an embodiment, as shown in FIG. 6 through FIG. 16, a single draw call can be used to render all particles in the particle buffer. Thus, the computational efficiency of rendering the particles is increased relative to attempting to render each particle individually.

Attention is now turned to the method of FIG. 3C. The method of FIG. 3C may be performed after the method of FIG. 3B.

Step 3CO2 includes projecting the updated position of the particle and the particle trail from the absolute coordinate system to a screen coordinate system of the GUI, to form a first projection. When a particle is to be displayed on the GUI, in some (if not most) a transformation (i.e., a projection) is performed between the absolute coordinate system to the screen coordinate system. In this manner, the scale and position from which the particles are viewed on the display device may be different than viewing the same particles from an absolute (i.e., unchanging) point of view.

Step 3C04 includes rendering the particle and the particle trail on the GUI in the screen coordinate system using the first projection. In an example, the particles and particle trails are rendered, and the rendered particles and particle trails are transformed by the projection and displayed on the display device. In another example, the particles and particle trails are transformed by the projection, and then the transformed particles and particle trails are rendered on the GUI.

Figure 3D:
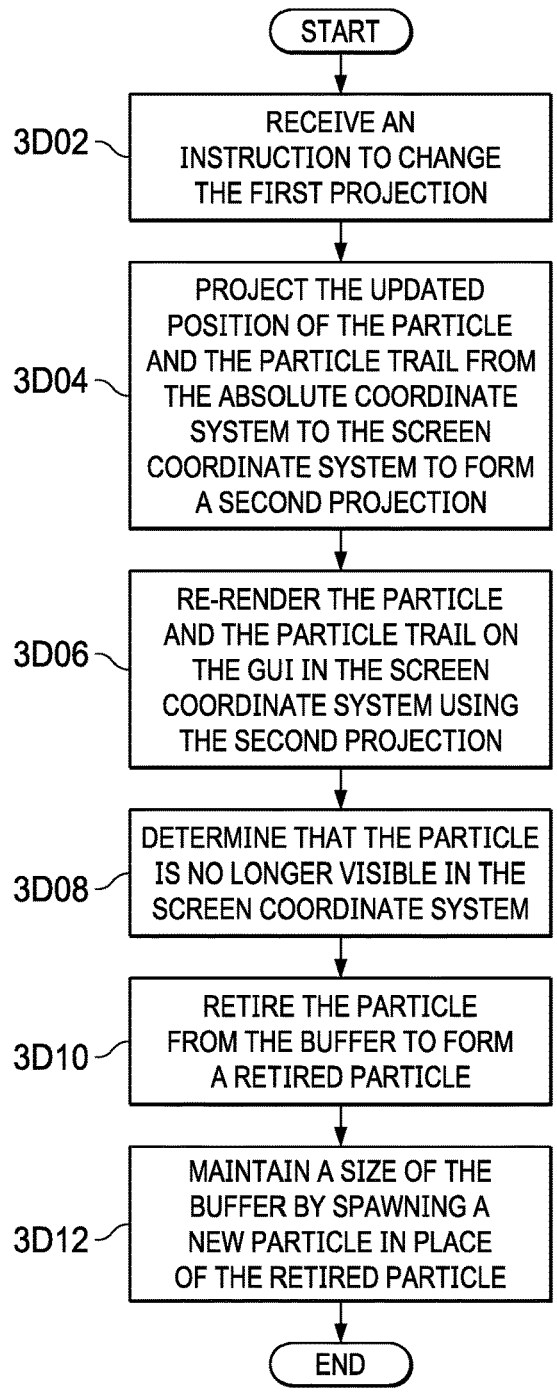

Attention is now turned to FIG. 3D. The method of FIG. 3D after the method of FIG. 3C.

Step 3D02 includes receiving an instruction to change the first projection. The instruction may be received by a user providing, via a user input device (the display screen, a keyboard, a mouse, etc.), a command to pan, zoom, turn, or otherwise adjust the image being displayed on the GUI.

The instruction may be in the form of a command that otherwise affects the calculation used to transform the absolute coordinates to screen coordinates. Thus, for example, either a user or another automated process user could input a command that adjusts the mathematical transformation that effects the projection from the absolute coordinates to the screen coordinates.

Step 3D04 includes projecting the updated position of the particle and the particle trail from the absolute coordinate system to the screen coordinate system to form a second projection. Projecting may be performed as described above with respect to step 3C04 in FIG. 3C.

Step 3D06 includes re-rendering the particle and the particle trail on the GUI in the screen coordinate system using the second projection. Again, rendering may be performed as described above with respect to step 3C04 in FIG. 3C.

In an embodiment, steps 3D02 through 3D06 may form an independent method that terminates after step 3D06. However, the method may continue with further steps.

Thus, steps 3D08 through 3D12 may be performed after step 3B02 in FIG. 3B. However, steps 3D08 through 3D12 may also be executed after steps 3D02 through 3D06.

Step 3D08 includes determining that the particle is no longer visible in the screen coordinate system. A particle may be no longer visible in the screen coordinate system because the user has selected a view position via panning or zooming in which the particle is no longer visible in the screen coordinate system.

Step 3D10 includes retiring the particle from the buffer to form a retired particle. Retiring the particle is performed by either clearing or overwriting the memory range in which the retired particle was being tracked. While the computer still tracks the position of the particle in the absolute coordinate system outside of the buffer, computational resources are saved by retiring the particle from the buffer.

Step 3D12 includes maintaining a size of the buffer by spawning a new particle in place of the retired particle. As used herein, the term "to spawn" means "to generate" or "to create." In some cases maintaining a size of the buffer (i.e., maintaining a predetermined number of memory ranges) may be advantageous from the perspective of saving computational resources. Thus, to maintain the size of the buffer when a particle is retired, a new particle can be spawned in place of the retired particle. The new particle is then tracked in the memory range formerly occupied by the retired particle. In this case, the new particle data overwrites the retired particle data in the memory range of the buffer.

Figure 3E:
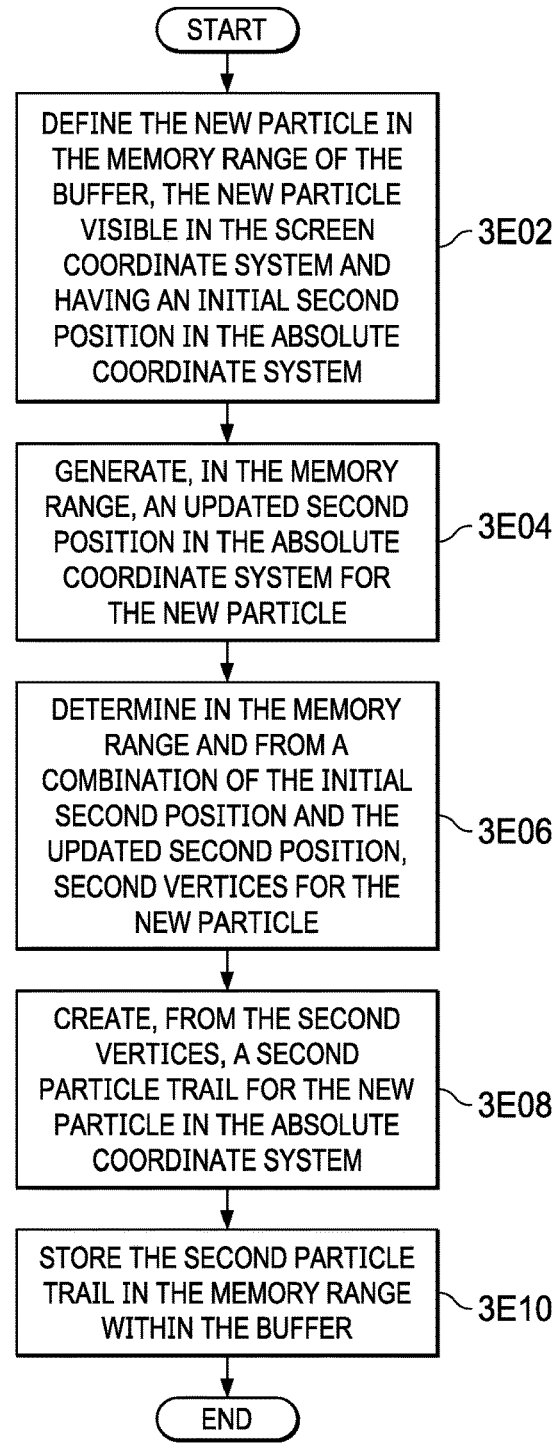

Attention is now turned to the method of FIG. 3E. The method of FIG. 3E may be performed after the method of FIG. 3D.

Step 3E02 includes defining the new particle in the memory range of the buffer, the new particle visible in the screen coordinate system and having an initial second position in the absolute coordinate system. In other words, the new particle is visible in the screen coordinate system after the user has panned, zoomed, or otherwise changed a viewpoint of the display. The new particle has also moved in the absolute coordinate system.

Step 3E04 includes generating, in the memory range, an updated second position in the absolute coordinate system for the new particle. To account for the movement of the particle, an updated second position of the particle is recorded in the memory range for that particle. The prior position of the new particle, if available, is retained in the memory range for purposes of generating a new particle trail.

Step 3E06 includes determining, in the memory range and from a combination of the initial second position and the updated second position, second vertices for the new particle. As indicated above, vertices are generated from the historical positions of particles (i.e. the particle trails). See step 306 of FIG. 3A.

Step 3E08 includes creating, from the second vertices, a second particle trail for the new particle in the absolute coordinate system. Creation of the second particle trail may be performed using a similar technique to that described with respect to step 308 of FIG. 3A.

Step 3E10 includes storing the second particle trail in the memory range within the buffer. Storing the second particle trail is similar to step 310 in FIG. 3A.

Figure 3F:
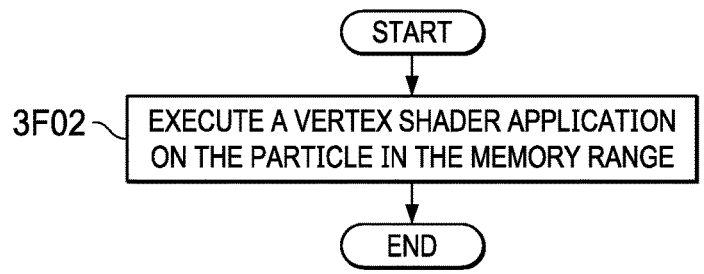

Attention is now turned to FIG. 3F. The method of FIG. 3F may be performed as part of step 304 of the method of FIG. 3A.

Step 3F02 includes executing a vertex shader application on the particle in the memory range. The vertex shader application is described with respect to vertex shader application (230) of FIG. 2. The vertex shader application is executed using the processor or the GPU. The vertex shader application takes as input the vertices generated in the method of FIG. 3A and/or the method of FIG. 3E, and generates as output a renderable shape. Examples of the vertex shader application in use are described with respect to FIG. 6 through FIG. 16.

Figure 3G:
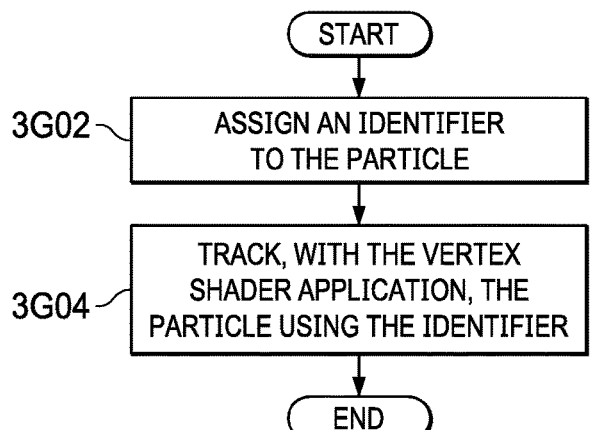

Attention is now turned FIG. 3G. The method of FIG. 3G may be performed as part of step 304 of the method of FIG. 3A and further may be performed after step 3F02 of FIG. 3F.

Step 3G02 includes assigning an identifier to the particle. The particle is assigned an identifier, such as a number or name or other alphanumeric string. The identifier is associated with the other particle characteristics using a pointer, including the identifier in a data structure that also includes the data describing the characteristics, placing the identifier in a header of such a data structure, or by some other technique for associating data together.

Step 3G04 includes tracking, with the vertex shader application, the particle using the identifier. The vertex shader application tracks the particle using the identifier by receiving, as input, position data from the corresponding memory range associated with the particle identifier. In this manner, the ongoing position of the particle can be tracked over time.

Figure 3H:
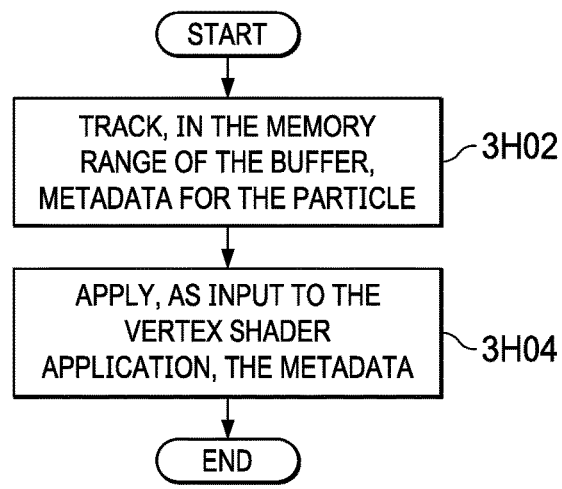

Attention is now turned to FIG. 3H. The method of FIG. 3H may be performed as part of step 304 of the method of FIG. 3A and also may be performed after step 3F02 of FIG. 3F.

Step 3H02 includes tracking, in the memory range of the buffer, metadata for the particle. The metadata may include timestamps, current particle age, maximum particle age, particle characteristics, etc. At each point in time that is tracked, the position and metadata of the particle is recorded within the memory range of the buffer.

Step 3H04 includes applying, as input to the vertex shader application, the metadata. The vertex shader application can, in some embodiments, use the metadata to refine or change the output that forms the shapes that are output. Examples are provided in FIG. 6 through FIG. 16.

Figure 3I:
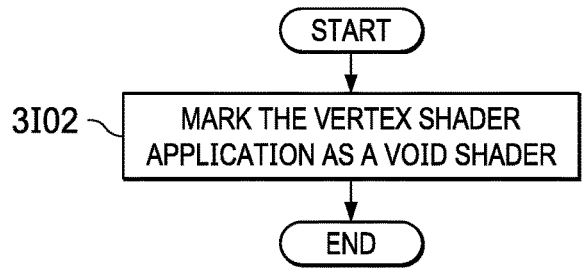

Attention is now turned to FIG. 3I. The method of FIG. 3I may be performed after step 306 of the method of FIG. 3A. Step 3I02 includes marking the vertex shader application as a void shader. Marking the vertex shader application as a void shader means that the resulting geometry from the vertex shader will not be run through a fragment program. The result is savings of processing resources, and thus increasing speed performance. In other words, a void shader only affects the input buffer and has no dedicated output as a regular vertex shader would.

Figure 3J:
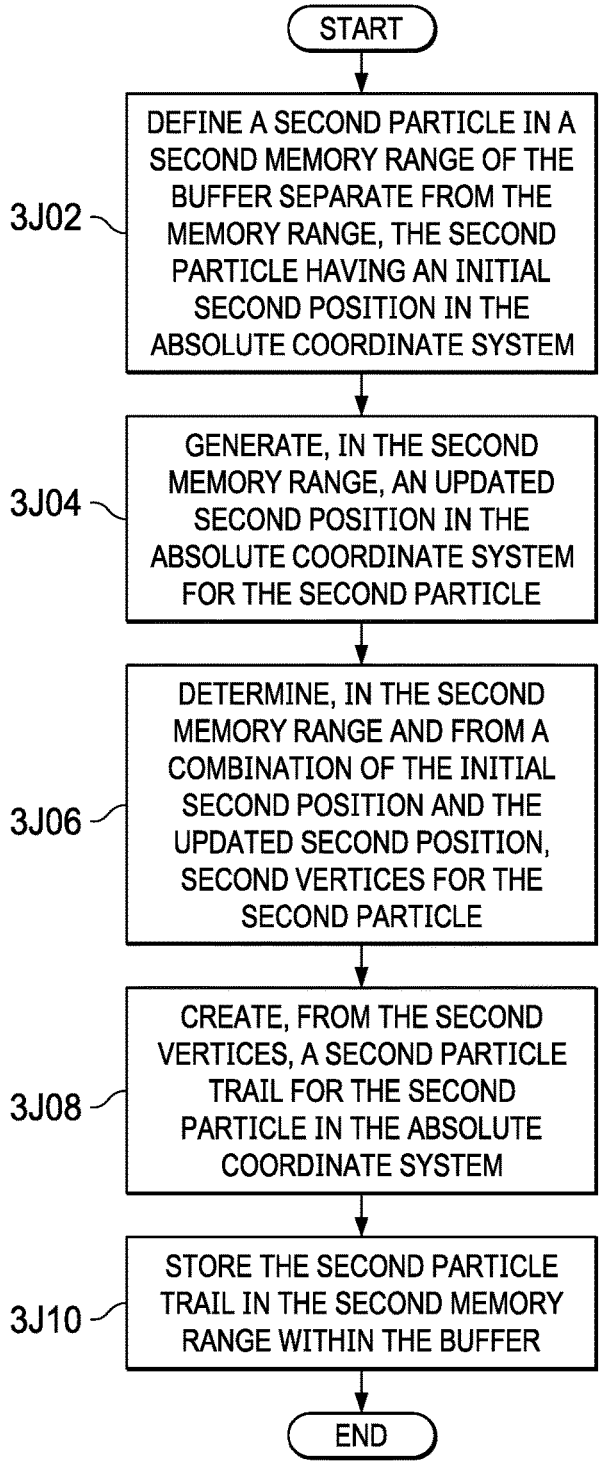

Attention is now turned to FIG. 3J. The method of FIG. 3J may be performed after the method of FIG. 3A. FIG. 3J shows that the method of FIG. 3A may be repeated with respect to a second particle. However, the method of FIG. 3J and the method of FIG. 3A may be performed concurrently using (in some embodiments) a single vertex shader application, thereby allowing for a smooth generation of multiple particles and particle trails.

Step 3J02 includes defining a second particle in a second memory range of the buffer separate from the memory range, the second particle having an initial second position in the absolute coordinate system. Defining the second particle is similar to step 300 in FIG. 3A.

Step 3J04 includes generating, in the second memory range, an updated second position in the absolute coordinate system for the second particle. Generating the updated second position is similar to step 304 in FIG. 3A.

Step 3J06 includes determining, in the second memory range and from a combination of the initial second position and the updated second position, second vertices for the second particle. Determining the second vertices is similar to step 306 in FIG. 3A.

Step 3J08 includes creating, from the second vertices, a second particle trail for the second particle in the absolute coordinate system. Creating the second particle trail is similar to step 308 in FIG. 3A.

Step 3J10 includes storing the second particle trail in the second memory range within the buffer. Storing the second particle trail is similar to step 310 in FIG. 3A.

Figure 3K:
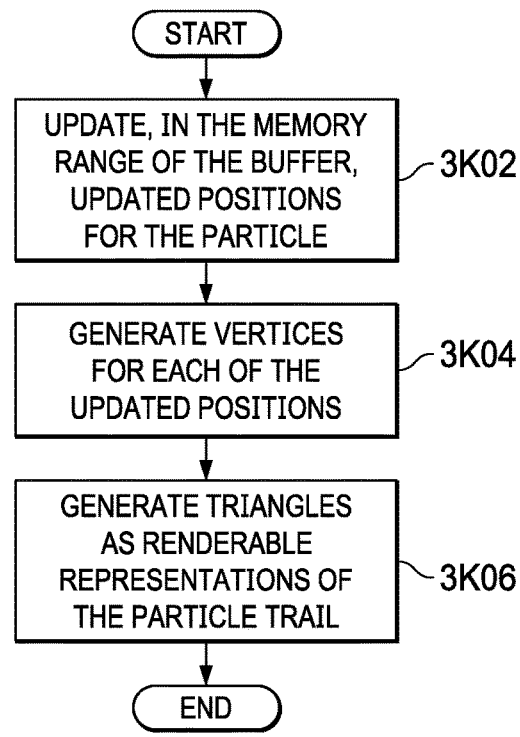

Attention is now turned to FIG. 3K. The method of FIG. 3K may be performed as part of step 308 of FIG. 3A. FIG. 3K shows that ongoing updates to the particles may also be rendered on the display device. Thus, a sequence of updates can be animated on the display device and/or the particle position and particle trail could be animated on the display device.

Step 3K02 includes updating, in the memory range of the buffer, updated positions for the particle. Updating the updated positions for the particle is similar to generating an updated position at step 304 in FIG. 3A, though continued updates are being performed.

Step 3K04 includes generating vertices for each of the plurality of updated positions. Generating the vertices is similar to step 306 in FIG. 3A.

Step 3K06 includes generating triangles as renderable representations of the particle trail. Step 3K06 is a variation of step 308 in FIG. 3A. An example of generating a triangle, from which the particle trail can be rendered, is shown in FIG. 6 through FIG. 12.

Figure 4A:
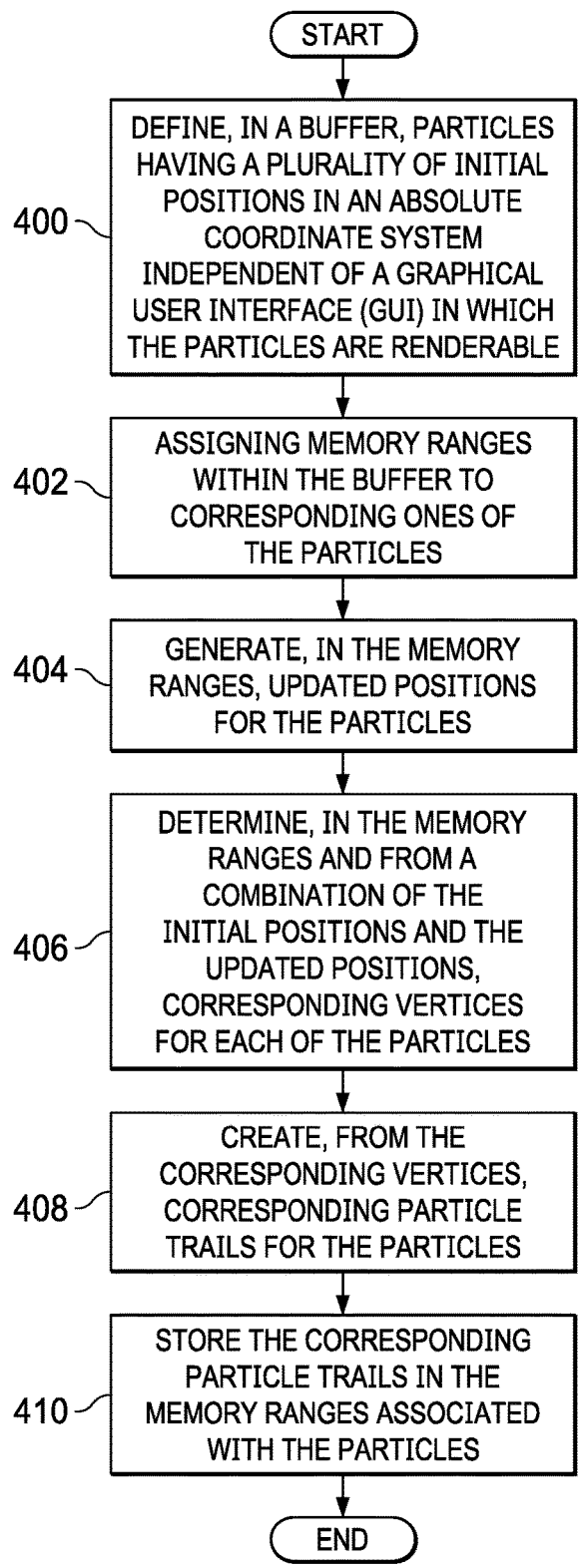

Attention is now turned to FIG. 4A. The method of FIG. 4A is a variation of the method of FIG. 3A. The method of FIG. 3A may also be implemented using the system of FIG. 1 and the components shown in the computing system of FIG. 17A and FIG. 17B. FIG. 4A through FIG. 4J show that the method of FIG. 3A through FIG. 3K may be performed on multiple particles. In an embodiment, the processing of the multiple particles is performed concurrently (i.e., in parallel) in order to improve the processing time of executing the methods.

Step 400 includes defining, in a buffer, particles having initial positions in an absolute coordinate system independent of a graphical user interface (GUI) in which the particles are renderable. Step 400 may be performed in a manner similar to that described with step 300 of FIG. 3A.

Step 402 includes assigning memory ranges within the buffer to corresponding ones of the particles. Step 402 may be performed in a manner similar to that described with step 302 of FIG. 3A.

Step 404 includes generating, in the memory ranges, updated positions for the particles. Step 404 may be performed in a manner similar to that described with step 304 of FIG. 3A.

Step 406 includes determining, in the memory ranges and from a combination of the initial positions and the updated positions, corresponding vertices for each of the particles. Step 406 may be performed in a manner similar to that described with step 306 of FIG. 3A.

Step 408 includes creating, from the corresponding vertices, corresponding particle trails for the particles. Step 408 may be performed in a manner similar to that described with step 308 of FIG. 3A.

Step 410 includes storing the corresponding particle trails in the memory ranges associated with the particles. Step 410 may be performed in a manner similar to that described with step 310 of FIG. 3A.

The method shown in FIG. 4A highlights other aspects of the one or more embodiments. For example, in an embodiment, each memory range in the memory ranges is assigned to a single particle in the particles and to a single particle trail in the corresponding particle trails. In other words, in this embodiment, a one-to-one correspondence exists between a given memory range and a given particle and the corresponding given particle trail.

In another example, creating the corresponding particle trails includes executing a vertex shader application on the memory ranges such that the vertex shader application is executed once for each of the particles. In other words, while multiple vertex shader applications could be used for multiple particles in multiple memory ranges, it is possible to use a single vertex shader application that operates on some or all of the particles and particle trails in multiple memory ranges.

Figure 4B:
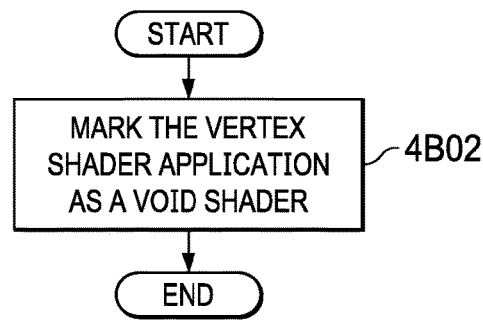

Attention is now turned to FIG. 4B. The method of FIG. 4B may be implemented after the method of FIG. 4A.

Step 4B02 includes marking the vertex shader application as a void shader. Step 4B02 is similar to step 3102 in FIG. 31.

Figure 4C:
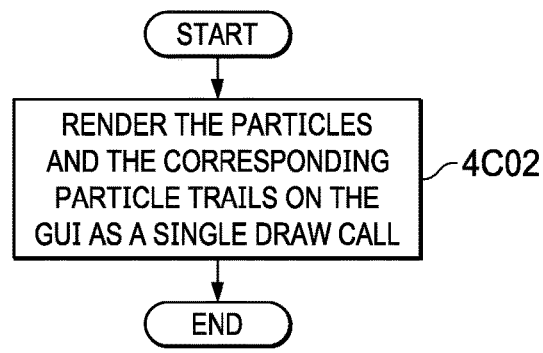

Attention is now turned to FIG. 4C. The method of FIG. 4C may be performed after the method of FIG. 4A.

Step 4CO2 includes rendering the particles and the corresponding particle trails on the GUI as a single draw call. Step 4CO2 is similar to step 3B02 in FIG. 3B.

Rendering may be performed in multiple stages. An example of rendering in stages is shown in FIG. 5 and further detailed with respect to FIG. 6 through FIG. 12.

Figures 8, 9:
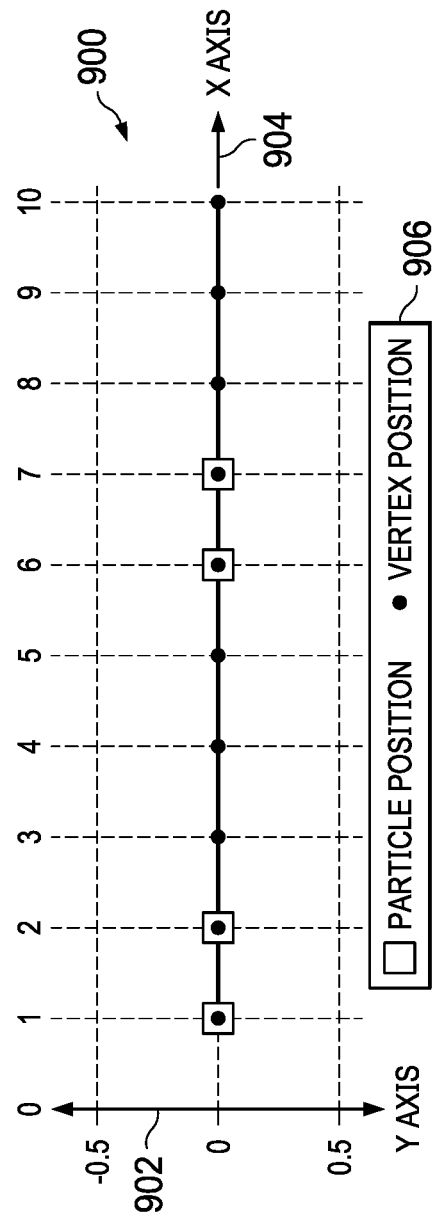

Briefly, in one embodiment, the corresponding vertices are degenerate and non-renderable in a first rendering stage. The term "degenerate" means that all the vertices of the triangle lie along a single line, causing that particular area of the polygon to be zero, and thus not renderable as a shape on the screen. An example of degenerate vertices is shown in FIG. 9.

Continuing the embodiment, in a second rendering stage, subsequent to the first rendering stage, the corresponding vertices and additional vertices form triangles as renderable representations of the corresponding particle trails. An example of forming the triangles is shown in FIG. 12.

Figure 16:
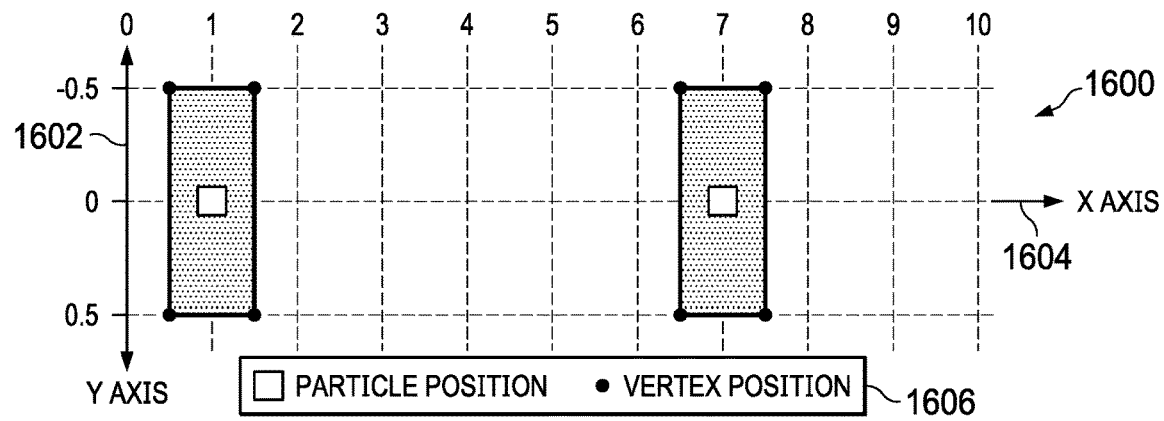
FIG. 16 shows a different technique for handling renderable vertices in relation to particle positions after additional updates, relative to FIG. 12, in accordance with one or more embodiments.

The second rendering stage can use other polygons. For example, in a second rendering stage, subsequent to the first rendering stage, the corresponding vertices and additional vertices form triangles that form rectangular quads as renderable representations of the corresponding particle trails. An example of forming the rectangular quads is shown in FIG. 16.

Thus, most generally, in a second rendering stage, subsequent to the first rendering stage, the corresponding vertices and additional vertices form polygons as renderable representations of the corresponding particle trails. The polygons may be formed from a combination of triangles. The polygons may also form independent polygon shapes (e.g., rectangles, pentagons, hexagons, octagons, etc.)

Attention is now turned to FIG. 4D. The method of FIG. 4D may be performed after the method of FIG. 4A.

Step 4D02 includes projecting the updated positions of the particles and the corresponding particle trails from the absolute coordinate system to a first screen coordinate system of the GUI, to form a first projection. Step 4D02 is similar to step 3CO2 in FIG. 3C.

Step 4D04 includes rendering the particles and the corresponding particle trails on the GUI in the first screen coordinate system. Step 4D04 is similar to step 3C04 in FIG. 3C.

Attention is now turned to FIG. 4E. The method of FIG. 4E may be performed after the method of FIG. 4D.

Step 4E02 includes receiving an instruction to change the first projection. Step 4E02 is similar to step 3D02 in FIG. 3D.

Step 4E04 includes projecting the updated positions of the particles and the corresponding particle trails from the absolute coordinate system to the screen coordinate system to form a second projection. Step 4E04 is similar to step 3D04 in FIG. 3D.

Step 4E06 includes re-rendering the particles and the corresponding particle trails on the GUI in the second screen coordinate system using the second projection. Step 4E06 is similar to step 3D06 in FIG. 3D.

Attention is now turned to FIG. 4F. The method of FIG. 4F may be performed after the method of FIG. 4D or after the method of FIG. 4E.

Step 4F02 includes determining that a particle in the particles is no longer visible in the second screen coordinate system. Step 4F02 is similar to step 3D08 in FIG. 3D.

Step 4F04 includes retiring the particle from the buffer to form a retired particle. Step 4F04 is similar to step 3D10 in FIG. 3D.

Step 4F06 includes maintaining a size of the buffer by spawning a new particle, in the particles, in place of the retired particle. Step 4F06 is similar to step 3D12 in FIG. 3D.

Attention is now turned to FIG. 4G. The method of FIG. 4G may be performed after the method of FIG. 4F.

Step 4G02 includes defining the new particle in one of the memory ranges of the buffer, the new particle visible in the second screen coordinate system and having an initial new position in the absolute coordinate system. Step 4G02 is similar to step 3E02 in FIG. 3E.

Step 4G04 includes generating, in the one of the memory ranges, an updated new position in the absolute coordinate system for the new particle. Step 4G04 is similar to step 3E04 in FIG. 3E.

Step 4G06 includes determining, in one of the memory ranges and from a combination of the initial new position and the updated new position, new vertices for the new particle. Step 4G06 is similar to step 3E06 in FIG. 3E.

Step 4G08 includes creating, from the new vertices, a new particle trail for the new particle in the absolute coordinate system. Step 4G08 is similar to step 3E08 in FIG. 3E.

Step 4G10 includes storing the new particle trail in one of the memory ranges within the buffer. Step 4G10 is similar to step 3E10 in FIG. 3E.

Attention is now turned to FIG. 4H. The method of FIG. 4H may be performed as part of 404 of FIG. 4A.

Step 4H02 includes executing a vertex shader application on each of the particles in the memory ranges. Step 4H02 is similar to step 3F02 in FIG. 3F.

Attention is now turned to FIG. 4I. The method of FIG. 4I may be performed as part of step 404 of FIG. 4A and further may be performed after step 4H02 of FIG. 4H.

Step 4I02 includes assigning corresponding identifiers to the particles. Step 4I02 is similar to step 3G02 in FIG. 3G.

Step 4I04 includes tracking, with the vertex shader application, the particles using the corresponding identifiers. Step 4I04 is similar to step 3G04 in FIG. 3G.

Attention is now turned to FIG. 4J. The method of FIG. 4J may be performed after the method of FIG. 4A, and also as part of step 404 of FIG. 4A Step 4J02 includes tracking, in the memory ranges of the buffer, metadata for the particles. Step 4J02 is similar to step 3H02 in FIG. 3H.

Step 4J04 includes applying, as input to the vertex shader application, the metadata. Step 4J04 is similar to step 3H04 in FIG. 3H. Again, the vertex shader application may be marked as a void shader.

Attention is now turned to FIG. 5. FIG. 5 shows a flowchart of a method for rendering particles and particle trails, in accordance with one or more embodiments. The method of FIG. 5 may be performed by a rendering application executed by a processor. Thus, the method of FIG. 5 may be implemented using the system of FIG. 1 or by one or more components in the computing system shown in FIG. 17A and FIG. 17B. Initially, a summary of the method of FIG. 5 is presented. Then, details regarding the steps of FIG. 5 are given.

At step 500 a call is made to render a frame. The call is requested by a request to the render application to render a frame in a series of frames to be rendered.

At step 502, a first render stage is executed. At the first stage, updated particle positions are calculated using a vertex shader.

At step 504, a second render stage is executed. At the second stage, renderable vertices are generated using the particle position information in the buffer. The renderable vertices represent the particle trail in a desired fashion. The renderable vertices can then be used to render the particle trail.

At step 506, a determination is made whether a new frame is to be processed. If so, (a "yes" determination at step 506), the process returns to step 500 and repeats. If not (a "no" determination at step 506), then the process terminates.

A "frame" is a time frame in which a particle's position is measured. Thus, if a particle's position is measured once per millisecond, then the frames are one millisecond and each frame will have a measurement of the particle's position at the given point in time.

Attention is returned to a summary of the operations of the one or more embodiments. Additional details to the method of FIG. 5 are then provided.

The one or more embodiments use a small buffer for each rendered particle to store the most recent positions in real world coordinates instead of screen space coordinates. Thus, the one or more embodiments does not use a screen-space buffer to store projected particle position histories.

The projected particle histories are then projected into screen space and rendered as particle trails on the GPU, using a projection that changes as desired if the camera point of view changes, without invalidating the stored particle positions. This procedure allows the same particles and their histories to be rendered continuously as the display changes (i.e., as the user pans or zooms the display.)

If panning or zooming causes an individual particle to no longer be visible within the visible screen space, that particle is "retired" and the memory for its position and history is then reused for a new particle generated within the currently visible area. Retiring particles allows for a much smoother transition and continuous rendering of visible particles while zooming and panning, while simultaneously generating new particles for any newly-visible areas.

The particle system rendering task is divided in two stages, as indicated above in FIG. 5. The render stage 1 (step 502) calculates updated particle positions using a vertex shader. The vertex shader is run as many times as there are particles in the particle system. A rendering pipeline passes desired data to the vertex shader. The data passed to the first stage vertex shader contains a buffer describing the current particle position along with other relevant metadata items such as particle current age and maximum age.

The draw command for an imaginary triangulated object causes the vertex shader to be run once per particle. An identifier integer is passed to the vertex shader that can be used to identify the particle in question. Based on the properties of the particle system, the particle's position is updated, and a new particle position is written back to the position buffer to a location that overwrites the oldest position in the buffer for that particle.

The vertex shader is marked as a "void" shader. Marking the vertex shader as a void shader means that the vertex shader does not have an associated fragment shader, as nothing is produced on the screen in this stage. Thus, marking the vertex shader as void further increases the efficiency of the one or more embodiments.

The render stage 2 (step 504) of the rendering process is a stage where the particle position buffer is used to generate renderable vertices that will represent the particle trail in the desired fashion. In the example provided in FIG. 6 through FIG. 12, each particle's trail is rendered as a triangle strip, which will appear as a line or ribbon. However, the generated vertices could instead represent a dashed line, a small sphere at each particle location, or any number of other ways of representing the particle trail.

For the triangle strip example presented below, a pair of renderable vertices is generated for each position in the particle trail, with the exception of the newest and oldest positions. The first and last vertex pairs of each particle are made degenerate in the vertex shader of this stage. The vertex pairs of this stage are calculated from each particle's current and historical positions, extending out each vertex to opposite directions, thereby creating a line depicting the particle's historical trajectory. The last part of render stage 2 (504) is to apply a fragment shader that colors the particle and it's trajectory as desired.

While the various steps in the flowcharts are presented and described sequentially, one of ordinary skill will appreciate that some or all of the steps may be executed in different orders, may be combined or omitted, and some or all of the steps may be executed in parallel. Thus, the one or more embodiments are not necessarily limited by the examples provided herein.

FIG. 6 through FIG. 16 present a specific example of the techniques described above with respect to FIG. 1 through FIG. 5. The following example is for explanatory purposes only and not intended to limit the scope of the one or more embodiments.

FIG. 6 through FIG. 12 should be viewed together. FIG. 6, FIG. 7, and FIG. 8 show tables associated with rendering particles and particle trails, in accordance with one or more embodiments. FIG. 9 shows vertices in relation to particle positions after a position update, in accordance with one or more embodiments. FIG. 10 and FIG. 11 show additional tables associated with rendering particles and particle trails, in accordance with one or more embodiments. FIG. 12 shows renderable vertices in relation to particle positions after additional updates, in accordance with one or more embodiments.

The example of FIG. 6 through FIG. 12 uses a buffer of particles positions, each stored as two dimensional "real" world locations. (However, the one or more embodiments may be used with respect to any number of dimensions.) Points are generated within the currently visible portion of the world (i. e., the Earth), using the current camera (i.e., the viewpoint selected by the user). Note that two dimensions are enough to describe a position of an object on a surface of a sphere; thus, in some embodiments, two dimensions can be used to describe a three dimensional real world location.

As described above, for each point, a buffer is maintained that stores the historical positions. The historical positions can then be used to render the particle trail independent of the camera angle, position or parameters.

The historical position array is a ring buffer. Thus, an index is maintained in memory that points to the oldest location in the array that can be overwritten by the newest location. The ring buffer data structure allows updates to the buffer without copying any values, thereby improving efficiency.

The example of FIG. 6 through FIG. 12 describes the processing of a particle system consisting of two particles. The particle system in this example stores five positions for each particle, where the positions represent the location of the particle at each of the five most recent time steps. The number of positions may be changed depending on the application.

Referring to FIG. 6, the particle buffer is primed with the initial particle positions, as shown in Table 1 (600). Thus, Table 1 (600) shows a particle buffer at frame 1 before render stage 1 (502). In this example, the particles move from left to right in a two-dimensional grid. However, a similar system can be extended to any number, "N", of dimensions. The buffer may also contain any other metadata items after each particle's position data buffer.

In the first stage of rendering, the position of particles at the next time step are calculated on the GPU, resulting in the position buffers as shown in Table 2 (700). Thus, referring to FIG. 7, Table 2 (700) shows a particle buffer at frame 1 after the render stage 1 (502) of FIG. 5.

The output produced at render stage 1 (502) is passed to the render stage 2 (504). Render stage 2 (504) generates additional vertices to create a "triangle strip" that is used for actual rendering on the display device. In this example, two vertices are generated for each particle position. The vertex shader output at render stage 2 (504) is as follows, considering that the particle width is 1.

Reference is made to FIG. 8, Table 3 (800). The cells highlighted by hashing represent vertices of degenerate triangles. Table 3 (800) shows the particle position buffer after the render stage 1 (502) in frame 1. Stated differently, Table 3 (800) shows the calculated vertex positions for on-screen rendering after one frame.

FIG. 9 is a graph (900) that depicts the corresponding result on screen after render stage 2 (504). The axes, Y axis (902) and the X axis (904) represent the absolute coordinate system. Particle positions and vertex positions are marked as indicated in legend (906). Thus, FIG. 9 shows renderable vertices (dots) in relation to the particle positions (squares) after a first position update.

As can be seen, after the first frame (i.e. at the output of render stage 2 (504)) the triangle strips are still completely degenerate. "Degenerate" means that all vertices of triangles lie along the same line. Because the triangle strips are degenerate nothing will be rendered on the display device.

However, the method of FIG. 5 continues with a new frame. In other words, time is advanced by one unit and new particle positions are measured for the two particles. The two stage process in FIG. 5 is repeated at the new frame.

Referring to FIG. 10, Table 4 (1000) shows the particle position buffer for the two particles after five frames. Thus, Table 4 (1000) shows the particle position buffer after five iterations of the method of FIG. 5, tracking the particle at each frame.

Referring to FIG. 11, Table 5 (1100) shows the vertex positions for on screen rendering after five frames. Thus, Table 5 (1100) shows a corresponding second stage output of a vertex strip.

FIG. 12 is another graph (1200). Graph (1200) is similar to graph (900) of FIG. 9, but after five frames have been executed using the method of FIG. 5. Thus, the Y axis (902), X axis (904), and legend (906) in in graph (1200) are identical to those in graph (900).

Like FIG. 9, graph (1200) of FIG. 12 shows renderable vertices (dots) in relation to particle positions (squares) after the additional position updates that occurred in the five frames. The triangles are now at least two dimensional, and thus can be rendered by a render application on the display device.

Thereafter, a mathematical transformation can be performed to project the rendered triangles from the absolute coordinate system to the screen coordinate system. The projection can be calculated quickly, compared to having to reinstitute and then re-calculating the positions and particle trails if the buffer had to be cleared. As a result, the user will perceive a smooth transition of rendered particles and particle trails as the user pans or zooms the display.

While the example illustrated here depicts the creation and use of a triangle strip as the renderable representation of the particle trails, the output of render stage 2 (504) can instead generate any alternative representation that might be desired for the particle trails. An example of an alternative representation is presented below in FIG. 13 through FIG. 16.

FIG. 13 through FIG. 16 should be considered together. FIG. 13, FIG. 14, and FIG. 15 show additional tables associated with rendering particles and particle trails, in accordance with one or more embodiments. FIG. 16 shows a different technique for handling renderable vertices in relation to particle positions after additional updates, relative to FIG. 12, in accordance with one or more embodiments. Thus, FIG. 13 through FIG. 16 are variations of the example shown in FIG. 6 through FIG. 12.

The tables shown in FIG. 13 through FIG. 16 are similar to those shown in FIG. 7 through FIG. 11, but are truncated for simplicity. The procedure is similar as well, because the method of FIG. 5 is still followed.

As with the example in FIG. 6 through FIG. 12, the particle system has two particles. The particle system in this example stores five positions for each particle, where the positions represent the location of the particle at each of the five most recent time steps. The number of positions may be changed depending on the application. However, only one position is shown in FIG. 13 through FIG. 15 to simplify the example.

Referring to FIG. 13, Table 6 (1300) is the particle buffer at frame 1 before rendering stage 1 (502). Table 6 (1300) indicates that the particle buffer is primed with the initial particle positions, as shown.

In this example the particles move from left to right in a two-dimensional grid, but the same system can be extended to a number, "N", dimensions. The buffer may also contain other metadata items after each particle's position data buffer. For example, the "age" and "maximum age" entries in Table 6 (1300) are instances of metadata associated with the particles.

Referring to FIG. 14, Table 7 (1400) shows the particle buffer at frame 1 after rendering stage 1 (502). The position of particles at the next time step are calculated on the GPU. The result of the particle position calculations is shown in the position buffers as indicated in Table 7 (1400).

The output of render stage 1 (502) is passed to the render stage 2 (504). Again, render stage 2 (504) generates additional vertices used to create the desired geometry that is used for actual rendering on the display.

In this example, four vertices are generated for each particle position to form a rectangular quad consisting of two triangles. The vertex shader output at render stage 2 (504) is as follows, considering that the quad side length is 1.

Referring to FIG. 15, Table 8 (1500) shows the calculated vertex positions for on-screen rendering after one frame. In other words, Table 8 (1500) shows the particle position buffer after render stage 1 (502) in frame 1.

FIG. 16 depicts the corresponding result on screen after render stage 2 (504) after five frames. Graph (1600) includes a Y axis (1602) and an X axis (1604) having units of "1" in the absolute coordinate system. As shown in legend (1606) particle positions are shown as squares and vertex positions are shown as dots.

The vertex positions after five frames include, per particle position, two triangles arranged as a rectangular quad (i. e., a rectangular shape formed by two triangles). After render stage 2 (506) as shown in FIG. 16, a render program can render the shapes on the display device.

Figure 17A:
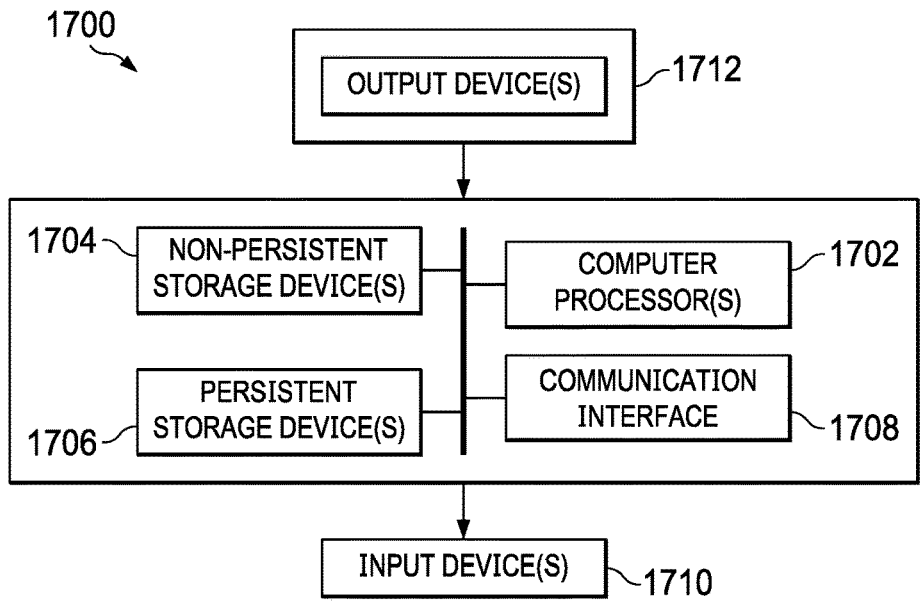
FIG. 17A and FIG. 17B show a computing system and network environment, in accordance with one or more embodiments.
Figure 17B:
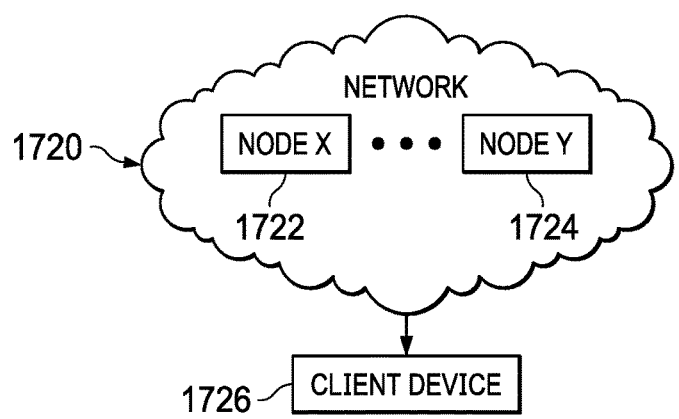

FIG. 17A and FIG. 17B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 17A, the computing system (1700) may include one or more computer processor(s) (1702), non-persistent storage device(s) (1704) (e.g., volatile memory, such as random access memory (RAM), cache memory), persistent storage device(s) (1706) (e.g., a hard disk, an optical drive such as a compact disk (CD) drive or digital versatile disk (DVD) drive, a flash memory, etc.), a communication interface (1708) (e.g., Bluetooth interface, infrared interface, network interface, optical interface, etc.), and numerous other elements and functionalities that implement the features and elements of the disclosure.

The computer processor(s) (1702) may be an integrated circuit for processing instructions. For example, the computer processor(s) (1702) may be one or more cores or micro-cores of a processor. The computing system (1700) may also include one or more input device(s) (1710), such as a touchscreen, a keyboard, a mouse, a microphone, a touchpad, an electronic pen, or any other type of input device.

The communication interface (1708) may include an integrated circuit for connecting the computing system (1700) to a network (not shown) (e.g., a local area network (LAN), a wide area network (WAN) such as the Internet, a mobile network, or any other type of network) and/or to another device, such as another computing device.

Further, the computing system (1700) may include one or more output device(s) (1712), such as a screen (e.g., a liquid crystal display (LCD), a plasma display, a touchscreen, a cathode ray tube (CRT) monitor, a projector, or other display device), a printer, an external storage, or any other output device. One or more of the output device(s) (1712) may be the same or different from the input device(s) (1710). The input and output device(s) (1710 and 1712) may be locally or remotely connected to the computer processor(s) (1702), the non-persistent storage device(s) (1704), and the persistent storage device(s) (1706). Many different types of computing systems exist, and the aforementioned input and output device(s) (1710 and 1712) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (1700) in FIG. 17A may be connected to or be a part of a network. For example, as shown in FIG. 17B, the network (1720) may include multiple nodes (e.g., node X (1722), node Y (1724)). Each node may correspond to a computing system, such as the computing system (1700) shown in FIG. 17A, or a group of nodes combined may correspond to the computing system (1700) shown in FIG. 17A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (1700) may be located at a remote location and connected to the other elements over a network.

Although not shown in FIG. 17B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1722), node Y (1724)) in the network (1720) may be configured to provide services for a client device (1726). For example, the nodes may be part of a cloud computing system. The nodes may include functionality to receive requests from the client device (1726) and transmit responses to the client device (1726). The client device (1726) may be a computing system, such as the computing system (1700) shown in FIG. 17A. Further, the client device (1726) may include and/or perform all or a portion of the one or more embodiments.

The computing system (1700) or group of computing systems described in FIG. 17A and 17B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, touchscreen, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (1700) in FIG. 17A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (1700) of FIG. 17A, while performing the one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc.

In one or more embodiments, if A and B are strings, the binary values of the strings may be compared.

The computing system (1700) in FIG. 17A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (1700) of FIG. 17A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (1700) of FIG. 17A and the nodes (e.g., node X (1722), node Y (1724)) and/or client device (1726) in FIG. 17B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
defining, in a buffer, a particle having an initial position in an absolute coordinate system independent of a graphical user interface (GUI) in which the particle is renderable;
assigning a memory range within the buffer to the particle;
generating, in the memory range, an updated position in the absolute coordinate system for the particle;
determining, in the memory range and from a combination of the initial position and the updated position, a plurality of vertices for the particle;
creating, from the plurality of vertices, a particle trail for the particle in the absolute coordinate system; and
storing the particle trail in the memory range within the buffer.

2. The method of claim 1, further comprising:
rendering the particle and the particle trail on the GUI as a single draw call.

3. The method of claim 2, wherein rendering comprises:
projecting the updated position of the particle and the particle trail from the absolute coordinate system to a screen coordinate system of the GUI, to form a first projection; and
rendering the particle and the particle trail on the GUI in the screen coordinate system using the first projection.

4. The method of claim 3, further comprising:
receiving an instruction to change the first projection;
projecting the updated position of the particle and the particle trail from the absolute coordinate system to the screen coordinate system, to form a second projection; and
re-rendering the particle and the particle trail on the GUI in the screen coordinate system using the second projection.

5. The method of claim 4, further comprising:
determining that the particle is no longer visible in the screen coordinate system;
retiring the particle from the buffer to form a retired particle; and
maintaining a size of the buffer by spawning a new particle in place of the retired particle.

6. The method of claim 5, further comprising:
defining the new particle in the memory range of the buffer, the new particle visible in the screen coordinate system and having an initial second position in the absolute coordinate system;
generating, in the memory range, an updated second position in the absolute coordinate system for the new particle;

determining, in the memory range and from a combination of the initial second position and the updated second position, a plurality of second vertices for the new particle;

creating, from the plurality of second vertices, a second particle trail for the new particle in the absolute coordinate system; and storing the second particle trail in the memory range within the buffer.

7. The method of claim 1, wherein the buffer is contained in a graphics processing unit (GPU) of a computer which displays the GUI.

8. The method of claim 1, wherein generating, in the memory range, the updated position in the absolute coordinate system for the particle comprises:

executing a vertex shader application on the particle in the memory range.

9. The method of claim 8, further comprising:
assigning an identifier to the particle; and
tracking, with the vertex shader application, the particle using the identifier.

10. The method of claim 8, further comprising:
tracking, in the memory range of the buffer, metadata for the particle; and
applying, as input to the vertex shader application, the metadata.

11. The method of claim 8, further comprising:
marking the vertex shader application as a void shader.

12. The method of claim 1, further comprising:
defining a second particle in a second memory range of the buffer separate from the memory range, the second particle having an initial second position in the absolute coordinate system;
generating, in the second memory range, an updated second position in the absolute coordinate system for the second particle;
determining, in the second memory range and from a combination of the initial second position and the updated second position, a plurality of second vertices for the second particle;
creating, from the plurality of second vertices, a second particle trail for the second particle in the absolute coordinate system; and
storing the second particle trail in the second memory range within the buffer.

13. The method of claim 1, creating the particle trail further comprises:
updating, in the memory range of the buffer, a plurality of updated positions for the particle;
generating a plurality of vertices for each of the plurality of updated positions; and
generating a plurality of triangles as renderable representations of the particle trail.

14. A system comprising:
a processor;
a display device, in communication with the processor, configured to display a graphical user interface (GUI);
a memory, in communication with the processor, comprising a buffer having a first memory range and a second memory range; and
a non-transitory computer readable storage medium in communication with the processor and storing computer readable program code which, when executed by the processor, performs a computer-implemented method comprising:
defining, in the buffer, a particle having an initial position in an absolute coordinate system independent of the GUI;
assigning the first memory range to the particle;
generating, in the first memory range, an updated position in the absolute coordinate system for the particle;
determining, in the first memory range and from a combination of the initial position and the updated position, a plurality of vertices for the particle;
creating, from the plurality of vertices, a particle trail for the particle in the absolute coordinate system; and
storing the particle trail in the first memory range within the buffer.

15. The system of claim 14, wherein the processor comprises a graphics processing unit (GPU) distinct from a central processing unit (CPU) also in communication with the memory and the display device.

16. The system of claim 14, wherein the buffer comprises a ring buffer.

17. The system of claim 14, wherein the non-transitory computer readable storage medium also stores a vertex shader application individually executable on both the first memory range and the second memory range.

18. A non-transitory computer readable storage medium storing computer readable program code which, when executed by a processor, performs a computer-implemented method comprising:
defining, in a buffer, a particle having an initial position in an absolute coordinate system independent of a graphical user interface (GUI) in which the particle is renderable;
assigning a memory range within the buffer to the particle;
generating, in the memory range, an updated position in the absolute coordinate system for the particle;
determining, in the memory range and from a combination of the initial position and the updated position, a plurality of vertices for the particle;
creating, from the plurality of vertices, a particle trail for the particle in the absolute coordinate system; and
storing the particle trail in the memory range within the buffer.

19. The non-transitory computer readable storage medium of claim 18, wherein the computer-implemented method further comprises:
rendering the particle and the particle trail on the GUI as a single draw call.

20. The non-transitory computer readable storage medium of claim 19, wherein, in the computer-implemented method, rendering comprises:
projecting the updated position of the particle and the particle trail from the absolute coordinate system to a screen coordinate system; and
rendering the particle and the particle trail on the GUI in the screen coordinate system.

* * * * *